(12) United States Patent
Wang et al.

(10) Patent No.: US 12,149,817 B2
(45) Date of Patent: Nov. 19, 2024

(54) IMAGE PROCESSING METHOD AND APPARATUS

(71) Applicant: Huawei Technologies Co., Ltd., Shenzhen (CN)

(72) Inventors: Yinting Wang, Hangzhou (CN); Chengtao Zhou, Shenzhen (CN); Xi Zhang, Hangzhou (CN); Yining Huang, Hangzhou (CN)

(73) Assignee: HUAWEI TECHNOLOIGES CO., LTD., Shenzhen (CN)

( * ) Notice: Subject to any disclaimer, the term of this patent is extended or adjusted under 35 U.S.C. 154(b) by 62 days.

(21) Appl. No.: 17/948,397

(22) Filed: Sep. 20, 2022

(65) Prior Publication Data
US 2023/0019164 A1 Jan. 19, 2023

Related U.S. Application Data

(63) Continuation of application No. PCT/CN2021/081094, filed on Mar. 16, 2021.

(30) Foreign Application Priority Data

Mar. 20, 2020 (CN) .......................... 202010202272.5

(51) Int. Cl.
 H04N 23/63 (2023.01)
 H04N 23/68 (2023.01)
 H04N 23/69 (2023.01)
(52) U.S. Cl.
 CPC ......... H04N 23/632 (2023.01); H04N 23/635 (2023.01); H04N 23/683 (2023.01); H04N 23/69 (2023.01)

(58) Field of Classification Search
 CPC .. H04N 23/632; H04N 23/635; H04N 23/683; H04N 23/69; H04N 23/60; H04N 23/61; H04N 23/62; H04N 23/631; H04N 23/64; H04N 23/67; H04N 23/80
 See application file for complete search history.

(56) References Cited

U.S. PATENT DOCUMENTS

| 2010/0245630 | A1 | 9/2010 | Kurokawa |
| 2012/0027268 | A1 | 2/2012 | Kwan |
| 2014/0267803 | A1 | 9/2014 | Shintani et al. |
| 2015/0042893 | A1 | 2/2015 | Li |
| 2016/0316147 | A1* | 10/2016 | Bernstein ............... H04N 23/69 |

(Continued)

FOREIGN PATENT DOCUMENTS

| CN | 101848338 A | 9/2010 |
| CN | 103945121 A | 7/2014 |

(Continued)

Primary Examiner — Yogesh K Aggarwal
(74) Attorney, Agent, or Firm — Conley Rose, P.C.

(57) ABSTRACT

An image processing method includes determining a target object in a to-be-photographed scene, determining a preview image based on the target object, a zoom ratio specified by a user, and an original image that is captured by a sensor of a terminal when the terminal uses a target lens to perform photographing at the zoom ratio, and displaying the preview image on a display of the terminal. The preview image may be displayed in a single preview region, or displayed in a plurality of preview regions that are formed in combination with an auxiliary preview image.

25 Claims, 19 Drawing Sheets

(56) References Cited

U.S. PATENT DOCUMENTS

| | | |
|---|---|---|
| 2018/0069983 A1 | 3/2018 | Cho et al. |
| 2019/0199925 A1 | 6/2019 | Zhang et al. |
| 2019/0379838 A1 | 12/2019 | Wang et al. |
| 2020/0358954 A1 | 11/2020 | Wang et al. |
| 2021/0168300 A1 | 6/2021 | Wang et al. |
| 2022/0159183 A1 | 5/2022 | Li et al. |

FOREIGN PATENT DOCUMENTS

| | | |
|---|---|---|
| CN | 104052923 A | 9/2014 |
| CN | 104349197 A | 2/2015 |
| CN | 104580899 A | 4/2015 |
| CN | 106909274 A | 6/2017 |
| CN | 108134903 A | 6/2018 |
| CN | 108391035 A | 8/2018 |
| CN | 109002787 A | 12/2018 |
| CN | 109784256 | 5/2019 |
| CN | 110072070 A | 7/2019 |
| CN | 110365897 A | 10/2019 |
| CN | 110445978 A | 11/2019 |
| CN | 105991915 B | 6/2020 |
| EP | 3018528 A1 | 5/2016 |

\* cited by examiner

IMAGE PROCESSING METHOD AND APPARATUS

CROSS-REFERENCE TO RELATED APPLICATIONS

This is a continuation of International Patent Application No. PCT/CN2021/081094 filed on Mar. 16, 2021, which claims priority to Chinese Patent Application No. 202010202272.5 filed on Mar. 20, 2020. The disclosures of the aforementioned applications are hereby incorporated by reference in their entireties.

TECHNICAL FIELD

This application relates to the photographing field, and in particular, to an image processing method and apparatus.

BACKGROUND

Photographing has become one of the most commonly used functions of various mobile terminals, such as a mobile phone, a tablet computer, smart glasses, and a wearable device. When a user needs to take a close-up photo of a distant target object, for example, a distant object such as a bird, a flower, or an eave, the user usually needs to take the photo in a high-ratio zoom mode. With a gradual improvement in a photographing function of a smartphone, currently the smartphone may also take a photo in a high-ratio zoom mode. However, compared with a smartphone that is disposed on a tripod to perform photographing, the smartphone that is directly held by the user in hand and that performs photographing in the high-ratio zoom mode has a problem of image jitters in a preview region. In addition, because the high-ratio zoom mode is usually used to take a photo of a distant object, slight shakes of a lens also cause great jitters in the preview region. This makes it difficult for the user to perform image composition, and even causes the photographed target object to move out of an image. Generally, an ideal photo may be obtained after several times of photographing, resulting in poor user experience.

Therefore, specific research needs to be carried out for a jitter problem in a high-ratio zoom photographing scenario.

SUMMARY

Embodiments of this application relate to an image processing method and apparatus, which may be applied to a photographing scenario such as a high-ratio zoom photographing scenario, to prevent a terminal held in hand from shaking and causing great jitters in a preview interface and having difficulty in taking a sharp photo of a target object, and to improve photographing performance.

It should be understood that in the solutions provided in embodiments of this application, a computing device is a device that can be abstracted as a computer system. A computing device that supports an image processing function may be referred to as an image processing device or an image processing apparatus. The image processing apparatus may be an entire machine of the computing device, or may be some components of the computing device, for example, a chip related to an image processing function, such as an image processor (Image Signal Processor (ISP)) or a system chip. The system chip is also referred to as a system on chip (SoC) or is referred to as a SoC chip. Further, the image processing apparatus may be a terminal such as a smartphone, or may be a system chip or an image processor that can be disposed in a terminal. In a physical implementation, the image processor may be integrated into a SoC chip, or may not be integrated into a SoC chip.

According to a first aspect, an image processing method is provided. The method includes obtaining a first preview image of a to-be-photographed scene, where the first preview image is corresponding to a first zoom ratio, determining a target object in the first preview image, obtaining a second original image of the to-be-photographed scene, where the second original image is an image that is captured by an image sensor of a terminal when the terminal uses a target lens to photograph the to-be-photographed scene, the target lens is a lens invoked by the terminal to photograph the to-be-photographed scene at a second zoom ratio, and the second zoom ratio is greater than the first zoom ratio, determining a second preview image based on the target object and the second original image, where the second preview image includes the target object, and displaying the second preview image on a display of the terminal.

It should be understood that the first zoom ratio may be a zoom ratio specified by a user, or may be a default zoom ratio inherent in a camera after the camera of the terminal is turned on. After the camera of the terminal is turned on, the target lens may be a default lens preset by a system. As the user adjusts the specified zoom ratio, the terminal may redetermine the target lens based on the zoom ratio specified by the user. The target object may be one object, or a plurality of objects, or may be all objects in a region, or may be understood as a target region. The second zoom ratio is a zoom ratio specified by the user.

A preview stream of the terminal includes one or more frames of preview images, for example, the second preview image. The terminal may predict a location of the target object in the second original image based on a location of the target object in the one or more preview images before the second original image. The foregoing more frames of preview images may be a plurality of consecutive frames of preview images, or a plurality of frames of preview images at periodic or aperiodic intervals. The location of the target object in the one or more frames of preview images (or original images) is tracked, a location of the target object in one or more next frames of original images is predicted, and then a preview image is determined. This reduces a jitter probability of the target object in the preview image, and better stabilizes the image.

After the first preview image is obtained, the first preview image may be displayed on the display of the terminal.

In the foregoing solution, the preview image is determined based on the target object and the original image that is captured by the sensor of the terminal when the terminal photographs the to-be-photographed scene. A current preview image may be adaptively changed based on a change of the target object (for example, a location change of the target object or redetermination of the target object), instead of determining the preview image only based on the original image that is captured by the sensor of the terminal when the terminal photographs the to-be-photographed scene. This reduces the probability that the target object moves out of the preview image when the terminal shakes.

In a possible implementation, the determining a second preview image based on the target object and the second original image further includes determining the second preview image based on the location of the target object in the second original image, the second zoom ratio, and the second original image.

A location of the target object in a to-be-cropped image is determined based on the location of the target object in the second original image. The terminal may determine a required digital zoom ratio m based on the second zoom ratio and an optical zoom ratio of the target lens, where m is greater than or equal to 1. For example, the digital zoom ratio m is a ratio of the second zoom ratio to the optical zoom ratio of the target lens. Further, the terminal may determine a size of a to-be-cropped region in the to-be-cropped image, and obtain the second preview image from the to-be-cropped image. For example, the location of the target object in the to-be-cropped image is used as a center, a size of $1/m^2$ is cropped from the to-be-cropped image and then zoomed in by $m^2$ times, to obtain the second preview image. Alternatively, the location of the target object in the second original image is used as a reference point, and based on the second zoom ratio and the second original image, a location of the to-be-cropped region is determined, for example, a central location of the to-be-cropped region or four-corner coordinates of the to-be-cropped region.

It should be understood that, as described above, the terminal may determine the required digital zoom ratio m based on the second zoom ratio and the optical zoom ratio of the target lens, and further determine the size of the to-be-cropped region in the to-be-cropped image. A location of a central point of the to-be-cropped region is determined based on the size of the to-be-cropped region, the location of the target object, and the second zoom ratio, to further determine the second preview image.

The second zoom ratio is a zoom ratio specified by the user, or is a default zoom ratio inherent in the terminal when the terminal photographs the to-be-photographed scene.

For example, the location of the target object in the to-be-cropped image is used as a reference point, and a size of $1/m^2$ is cropped from the to-be-cropped image and then zoomed in by $m^2$ times, to obtain the second preview image including the target object such that the target object is not fixed at a central location of the preview image. This increases diversity of image composition.

The to-be-cropped image may be the second original image, or an intermediate image obtained based on the second original image, for example, an image obtained after the second original image is cropped based on a display specification of the terminal, or may be an image obtained after preview image processing or partial preview image processing (for example, first preview image processing) is performed on the second original image, or may be an image obtained after preview image processing or partial preview image processing (for example, first preview image processing) and cropping based on the display specification of the terminal are performed on the second original image. In addition, before the second preview image is obtained in the foregoing processing process, preview image processing or partial preview image processing (for example, second preview image processing) may be further performed. The first preview image processing and the second preview image processing may be the same or may be different. A sequence of the foregoing processing operations such as cropping the size of $1/m^2$, zooming in by $m^2$, previewing image processing or partial image processing, and processing based on the display specification of the terminal may be adjusted. This is not limited in this application. Generally, the image obtained after the second original image is cropped based on the display specification of the terminal is used as the to-be-cropped image, the location of the target object in the to-be-cropped image is used as a center or a reference point, a size of $1/m^2$ is cropped and then zoomed in by $m^2$ times, and then preview image processing is performed to obtain the second preview image. This manner can reduce computing resources required by the terminal for processing the foregoing image, and improves a processing speed.

In a possible implementation, after the displaying the second preview image on a display of the terminal, the method further includes receiving a first operation on the target object in the second preview image, where the first operation determines a target location of the target object in a new preview image, determining an updated second preview image based on the target location of the target object in the new preview image and the second original image, where the updated second preview image includes the target object, and displaying the updated second preview image on the display of the terminal.

In a possible implementation, after the displaying the second preview image on a display of the terminal, the method further includes receiving a first operation on the target object in the second preview image, where the first operation determines a target location of the target object in a new preview image, obtaining a third original image of the to-be-photographed scene, where the third original image is an image that is captured by the sensor of the terminal when the terminal uses the target lens to photograph the to-be-photographed scene, and capture time of the second original image is earlier than that of the third original image, determining a third preview image based on the target location of the target object in the new preview image and the third original image, where the third preview image includes the target object, and displaying the third preview image on the display of the terminal.

It should be understood that the new preview image includes the third preview image. The first operation may be a gesture operation, a voice operation, a facial operation, or another type of operation. For example, the terminal detects and receives a two-finger drag of the user on the target object in the second preview image through a touchscreen, and determines a target location of the target object in the third preview image based on a direction and a distance of the two-finger drag of the user and the location of the target object in the second preview image. For a change between the target location and a location of the target object in the second preview image, a direction is the same as a direction of the two-finger drag of the user, and a distance is in proportion to a distance of the two-finger drag of the user. A value of the proportion may be set by the user on a system setting interface based on a precision granularity, or may be set based on a usage habit of the user or a large quantity of users.

The second original image and the third original image are different images that are captured by the sensor of the terminal when a same target lens is used to photograph the to-be-photographed scene. Generally, the capture time corresponding to the second original image and the capture time corresponding to the third original image are not completely the same, and a time interval is short.

As described above, the terminal determines a size and a zoom ratio of the to-be-cropped region based on the second zoom ratio, and determines the third preview image based on the third original image and the determined target location of the target object in the third preview image and the size and the zoom ratio of the to-be-cropped region. The to-be-cropped image may be the third original image, or an intermediate image obtained based on the third original image. Herein, refer to the intermediate image obtained based on the second original image. Details are not described herein again.

In the foregoing solution, the location of the target object in the preview image may be adjusted through an indication operation performed by the user on the target object, to meet diversified image composition requirements of the user, and avoid unity caused by a fixed location of the target object in the preview image.

In a possible implementation, the method further includes displaying a first preview region and a second preview region on the display of the terminal after the terminal enters an image stabilization mode. The first preview region is used to display an auxiliary preview image. The second preview region is used to display the second preview image. The auxiliary preview image includes content of the second preview image.

It should be understood that the image stabilization mode may also be referred to as an auxiliary preview mode, a multi-preview-region mode, or the like, and may be selected and entered in a specific mode on a setting interface for photographing by the user or the system setting interface. The foregoing name is not limited in this application. In addition, a field of view of the auxiliary preview image is greater than a field of view of the second preview image.

In a possible implementation, the method further includes displaying a first preview region and a second preview region on the display of the terminal when the second zoom ratio is greater than a preset threshold. The first preview region is used to display an auxiliary preview image. The second preview region is used to display the second preview image. The auxiliary preview image includes content of the second preview image.

It should be understood that a value of the preset threshold may be preset by the user. For example, the user may set the value on the system setting interface of the terminal. Alternatively, a value of the preset threshold may be set based on an empirical value. For example, survey is performed on the user to determine a zoom ratio when the user is not aware of slight hand shakes. A value of the ratio is determined as the preset threshold.

Similarly, the second preview region may be further used to display another preview image in the preview stream, for example, the third preview image. Content displayed in the first preview region and content displayed in the second preview region may be exchanged through an operation of the user. For example, an operation on the first preview region and the second preview region (for example, an operation of sliding a single finger from the first preview region to the second preview region) is received. In response to the foregoing operation, the content displayed in the first preview region and the content displayed in the second preview region are exchanged. In other words, the first preview region displays the second preview image, and the first preview region displays the auxiliary preview image.

A size and a display specification of the first preview region may be further adjusted based on indication of the user. For example, an operation on the first preview region (for example, sliding two fingers simultaneously in opposite directions on the first preview region) is received. In response to the foregoing operation, the first preview region is zoomed in at a specific ratio. A value of the ratio may be set by the user on the system setting interface based on a precision granularity, or may be set based on a usage habit of the user or a large quantity of users.

In the foregoing solution, the user perceives a location of a current preview image (for example, the second preview image or the third preview image) in a current to-be-photographed scene based on the displayed auxiliary preview image. This facilitates the user to adjust image composition. A size, a display specification, and display content corresponding to the preview region are adjustable. This improves use flexibility of the user.

In a possible implementation, the auxiliary preview image is determined based on the second original image. For example, the auxiliary preview image is determined based on the second original image or an intermediate image obtained based on the second original image. The field of view of the auxiliary preview image should be greater than a field of view of the second original image. Under a same condition (for example, for a same to-be-cropped image), a range of a to-be-cropped region corresponding to the auxiliary preview image should be greater than a range of a to-be-cropped region corresponding to the second original image.

When the auxiliary preview image and the second original image are determined based on a same original image, only a same target lens may be invoked, and another lens does not need to be invoked to photograph the to-be-photographed scene. In addition, the foregoing images may be processed by using a similar or same image processing procedure or method. This reduces hardware costs and software algorithm costs, and improves a processing speed.

In a possible implementation, the auxiliary preview image is determined based on an auxiliary original image. The auxiliary original image and the second original image are different images that are captured by image sensors of the terminal when the terminal invokes different lenses to photograph the to-be-photographed scene.

For a terminal having a plurality of lenses, the foregoing different lenses are expected to simultaneously photograph the to-be-photographed scene. An image captured by the sensor of the terminal carries a timestamp. After preview image processing is performed on the captured image, synchronization is performed based on the timestamp when the captured image is sent to the display and displayed. However, due to differences in parameters such as precision and a frame rate of different lenses and sensors, images with the same timestamp may not correspond to same absolute time. In other words, the capture time corresponding to the auxiliary original image and the capture time corresponding to the second original image are not completely the same, but the time interval is short, for example, 0.01 milliseconds. In addition, a sequence of the capture time corresponding to the auxiliary original image and the capture time corresponding to the second original image may be adjusted. This is not limited in this application.

In a possible implementation, the first preview image includes a first object. The determining a target object in the first preview image further includes determining the first object as the target object when the first object is a system preset object.

It should be understood that the system preset object includes one or more objects. The first object may be a first system preset object detected by the terminal, or may be a system preset object with a highest priority detected by the terminal, or may be a system preset object with a largest quantity detected by the terminal.

The system preset object may be set by the user on the system setting interface, or an object with a high photographing probability for the user may be set as the system preset object based on a photographing habit of the current user or a large quantity of users.

Based on a system preset object category list of the target object, the terminal directly identifies the target object in the first preview image. This reduces user interaction, improves processing efficiency, and facilitates a user operation.

In a possible implementation, the first preview image includes a first object. The determining a target object in the first preview image further includes receiving a second operation on the first object in the first preview image, and determining the first object as the target object in response to the second operation.

The second operation may be one or more of a gesture operation such as tap, double tap, touch and hold, and knuckle tap of a finger, a mid-air gesture, and the like, or may be a voice operation or a facial operation. This is not limited in this application.

In a possible implementation, the determining a target object in the first preview image further includes receiving a third operation on a first region in the first preview image, and determining an object in the first region as the target object in response to the third operation.

The third operation may be a gesture operation of defining the first region with a single finger, two fingers, a knuckle, or the like, or a mid-air gesture, a voice operation, or a facial operation. This is not limited in this application.

In the foregoing manner in which the user directly specifies a specific object or a specific region as the target object, user interaction perception is improved. The terminal can more accurately identify the target object that the user needs to photograph. This reduces a correction probability for the user.

In addition, in a photographing process, the user may redetermine the target object.

In a possible implementation, the target object is identified by an identifier frame and/or a symbol identifier in the second preview image.

The identifier frame may be of a regular shape, for example, a square shape or a circle shape, or may be of an irregular shape, for example, an outline shape of the target object. The symbol identifier may be a symbol such as a star-shaped symbol or a cross-shaped symbol, or may be a straight line or a curve. A line thickness and color of the identifier frame and the symbol identifier may be adjusted. Generally, a slightly thicker or brighter line may be used for identification, to distinguish from another object in the image. Similarly, the target object may also be identified in another preview image in the preview stream.

In the foregoing solution, the location of the target object in the preview image is identified by the identifier frame and/or the symbol identifier such that the user can learn the target object currently determined by the terminal and determine or adjust the target object, to avoid that an incorrect to-be-cropped region is caused by false identification.

According to a second aspect, an image processing method is provided. The method includes obtaining a first preview image of a to-be-photographed scene, where the first preview image is corresponding to a first zoom ratio, determining a target region in the first preview image, obtaining a second original image of the to-be-photographed scene, where the second original image is an image that is captured by an image sensor of a terminal when the terminal uses a target lens to photograph the to-be-photographed scene, the target lens is a lens invoked by the terminal to photograph the to-be-photographed scene at a second zoom ratio, and the second zoom ratio is greater than the first zoom ratio, determining a second preview image based on the target region and the second original image, where the second preview image includes the target region, and displaying the second preview image on a display of the terminal.

It should be understood that the target region may also be understood as a target object. For technical details, technical effects, and possible implementations of the second aspect and the possible implementations of the second aspect, refer to related descriptions of any one of the first aspect and the possible implementations of the first aspect. Details are not described herein again.

According to a third aspect, an image processing apparatus is provided. The apparatus includes a transceiver unit and a processing unit. The transceiver unit is configured to obtain a first preview image of a to-be-photographed scene, where the first preview image is corresponding to a first zoom ratio. The processing unit is configured to determine a target object in the first preview image. The transceiver unit is further configured to obtain a second original image of the to-be-photographed scene, where the second original image is an image that is captured by an image sensor of a terminal when the terminal uses a target lens to photograph the to-be-photographed scene, the target lens is a lens invoked by the terminal to photograph the to-be-photographed scene at a second zoom ratio, and the second zoom ratio is greater than the first zoom ratio. The processing unit is further configured to determine a second preview image based on the target object and the second original image, where the second preview image includes the target object. The processing unit is further configured to enable a display of the terminal to display the second preview image.

It should be understood that the transceiver unit and the processing unit may be implemented by software, for example, a computer program or instructions having the foregoing functions. The corresponding computer program or the corresponding instructions may be stored in a memory inside the terminal. A processor reads the corresponding computer program or the corresponding instructions in the memory to implement the foregoing functions. Alternatively, the image processing apparatus may be implemented by hardware. The processing unit is a processor (for example, a graphics processing unit (GPU) or a processor in a system chip). The transceiver unit is a transceiver circuit or an interface circuit. Alternatively, the image processing apparatus in this embodiment of this application may be implemented by a combination of a processor and a software module. For technical details, technical effects, and possible implementations of the third aspect and the possible implementations of the third aspect, refer to related descriptions of any one of the first aspect, the second aspect, and the possible implementations of the first aspect and the second aspect. Details are not described herein again.

In a possible implementation, that the processing unit is further configured to determine a second preview image based on the target object and the second original image further includes that the processing unit is further configured to determine the second preview image based on a location of the target object in the second original image, the second zoom ratio, and the second original image.

In a possible implementation, the transceiver unit is further configured to receive a first operation on the target object in the second preview image, where the first operation determines a target location of the target object in a new preview image. The processing unit is further configured to determine an updated second preview image based on the target location of the target object in the new preview image and the second original image, where the updated second preview image includes the target object. The processing unit is further configured to enable the display of the terminal to display the updated second preview image.

In a possible implementation, the transceiver unit is further configured to receive a first operation on the target object in the second preview image, where the first operation determines a target location of the target object in a new preview image. The transceiver unit is further configured to obtain a third original image of the to-be-photographed scene, where the third original image is an image that is captured by the sensor of the terminal when the terminal uses the target lens to photograph the to-be-photographed scene, and capture time of the second original image is earlier than that of the third original image. The processing unit is further configured to determine a third preview image based on the target location of the target object in the new preview image and the third original image, where the third preview image includes the target object. The processing unit is further configured to enable the display of the terminal to display the third preview image.

In a possible implementation, the processing unit is further configured to enable the display of the terminal to display a first preview region and a second preview region when the second zoom ratio is greater than a preset threshold. The first preview region is used to display an auxiliary preview image. The second preview region is used to display the second preview image. The auxiliary preview image includes content of the second preview image.

In a possible implementation, the auxiliary preview image is determined based on the second original image.

In a possible implementation, the auxiliary preview image is determined based on an auxiliary original image. The auxiliary original image and the second original image are different images that are captured by image sensors of the terminal when the terminal invokes different lenses to photograph the to-be-photographed scene.

In a possible implementation, the first preview image includes a first object. That the processing unit is configured to determine a target object in the first preview image further includes that the processing unit is configured to determine the first object as the target object when the first object is a system preset object.

In a possible implementation, the first preview image includes a first object. The transceiver unit is configured to receive a second operation on the first object in the first preview image. That the processing unit is configured to determine a target object in the first preview image further includes that the processing unit is configured to determine the first object as the target object in response to the second operation.

In a possible implementation, the transceiver unit is configured to receive a third operation on a first region in the first preview image. The processing unit is configured to determine a target object in the first preview image further includes that the processing unit is configured to determine an object in the first region as the target object in response to the third operation.

In a possible implementation, the target object is identified by an identifier frame and/or a symbol identifier in the second preview image.

In a possible implementation, the second zoom ratio is a zoom ratio specified by a user.

In a possible implementation, the target object is located at a location other than a central location in the second preview image.

According to a fourth aspect, a terminal is provided. The terminal includes a touchscreen, a camera, one or more processors, a memory, a plurality of applications, and one or more computer programs. The touchscreen includes a touch-sensitive surface and a display. The one or more computer programs are stored in the memory. The one or more computer programs include instructions. When the instructions are executed by the terminal, the terminal performs the image processing method according to any one of the first aspect to the second aspect and the possible implementations.

According to a fifth aspect, an electronic device is provided, including a touchscreen, a memory, one or more processors, a plurality of applications, and one or more programs. The one or more programs are stored in the memory. When the one or more processors execute the one or more programs, the electronic device is enabled to perform the image processing method according to any one of the first aspect to the second aspect and the possible implementations.

According to a sixth aspect, a computer storage medium is provided, including computer instructions. When the computer instructions are run on an electronic device, the electronic device is enabled to perform the image processing method according to any one of the first aspect to the second aspect and the possible implementations.

According to a seventh aspect, a computer program product is provided. When the computer program product runs on a computer, the computer is enabled to perform the image processing method according to any one of the first aspect to the second aspect and the possible implementations.

For technical details, technical effects, and possible implementations of any one of the fourth aspect to the seventh aspect and the possible implementations of the fourth aspect to the seventh aspect, refer to related descriptions of any one of the first aspect, the second aspect, and the possible implementations of the first aspect and the second aspect. Details are not described herein again.

It should be understood that the image processing solution provided in embodiments of this application may improve image photographing stability. Especially when the zoom ratio specified by the user is a high zoom ratio, an original image to be processed by the terminal may be cropped based on the location of the target object, to improve image photographing performance. In addition, the location of the target object in the preview image may be further adjusted through an adjustment operation of the user. This improves image composition flexibility. Amulti-preview-region displaying manner may further help the user adjust the target object and learn the location of the current target object in the image captured by the camera. This reduces a probability that the target object moves out of the image.

DESCRIPTION OF EMBODIMENTS

The following further describes technical solutions provided in this application with reference to the accompanying drawings and embodiments. It should be understood that system architectures and service scenarios in embodiments of this application are mainly intended to describe possible implementations of the technical solutions of this application, and should not be construed as a unique limitation on the technical solutions of this application. A person of ordinary skill in the art may learn that, with evolution of system architectures and emergence of new service scenarios, the technical solutions provided in this application are also applied to similar technical problems.

Embodiments of this application provide an image processing solution, including an image processing method and apparatus. The image processing method provided in embodiments of this application may be applied to a computing device (for example, the image processing apparatus or an electronic device provided in this application). During photographing or video recording, a target object in a preview stream can be tracked, and a preview image is cropped from a photographed image based on a location of the target object. Therefore, when a photographing apparatus is held in hand to photograph a high-ratio zoom scene, the target object is prevented from moving out of the photographed image when a hand or the photographing apparatus shakes. This improves photographing stability.

The image processing method in embodiments of this application may be applied to an electronic device such as a mobile phone, a tablet computer, a wearable device, a vehicle-mounted device, an augmented reality (AR) device/a virtual reality (VR) device, a laptop computer, an ultra-mobile personal computer (UMPC), a netbook, or a personal digital assistant (PDA). A specific type of the electronic device is not limited in embodiments of this application.

Figure 1:
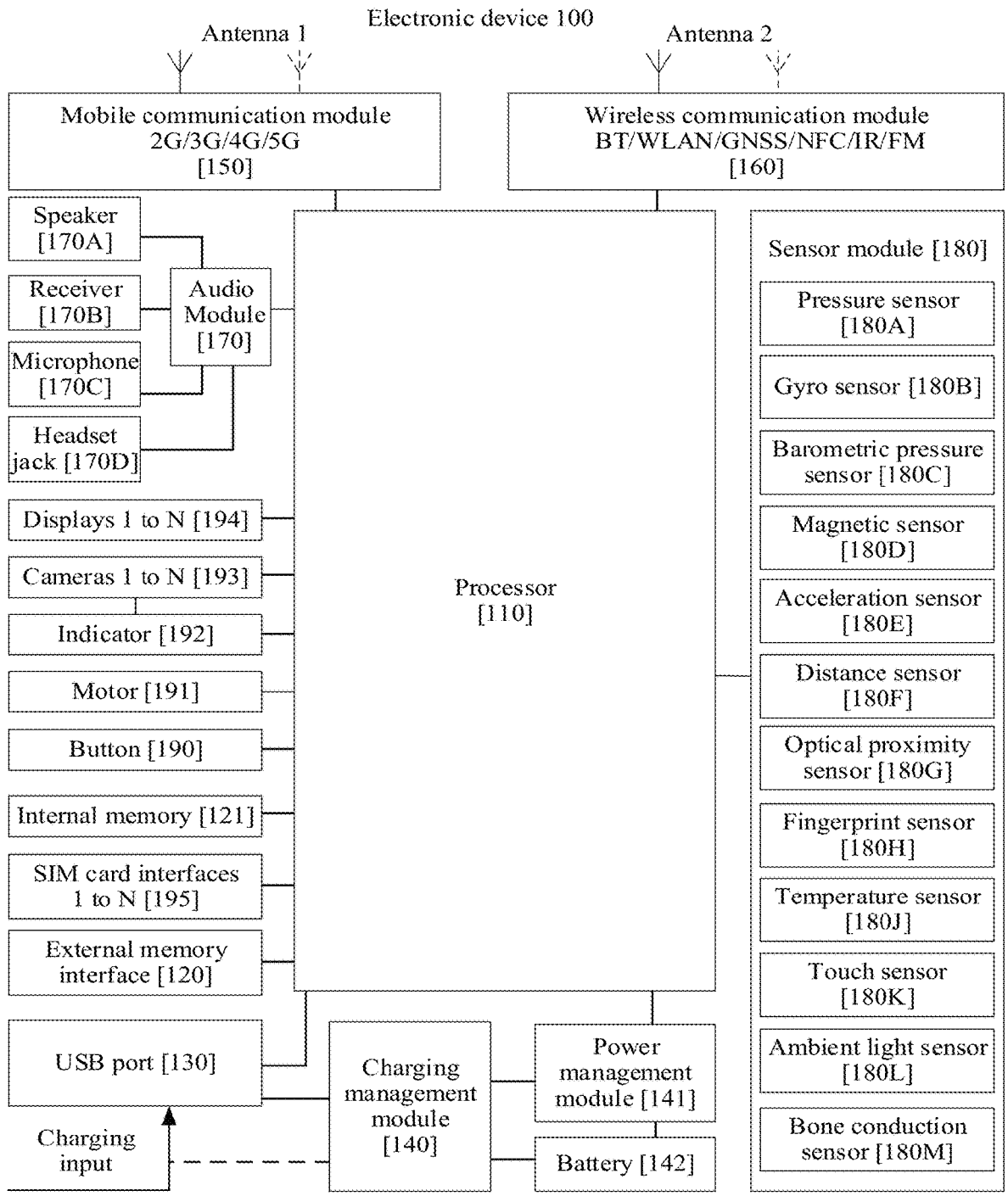
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a Universal Serial Bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a GPU, an ISP, a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a subscriber identity module (SIM) interface, a USB port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a BLUETOOTH (BT) headset.

The PCM interface may also be configured to perform audio communication, and sample, quantize, and code an analog signal. In some embodiments, the audio module 170 may be coupled to the wireless communication module 160 through the PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be a mini USB port, a micro USB port, a USB type-C port, or the like. The USB port 130 may be configured to connect to a charger to charge the electronic device 100, or may be configured to transmit data between the electronic device 100 and a peripheral device, may be configured to connect to a headset for playing audio through the headset. The port may be further configured to connect to another electronic device such as an augmented reality (AR) device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including second generation (2G), third generation (3G), fourth generation (4G), fifth generation (5G), and the like. The mobile communication module 150 may include at least one filter, a switch, a power amplifier, a low-noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (WLAN) (for example, a Wi-Fi network), BT, a global navigation satellite system (GNSS), frequency modulation (FM), a near-field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through a lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as a red, green, and blue (RGB) or a luma, blue projection, red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information by drawing on a structure of a biological neural network, for example, by drawing on a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage region and a data storage region. The program storage region may store an operating system, an application required by at least one function (for example, a sound playing function or an image playing function), and the like. The data storage region may store data (such as audio data and an address book) created during use of the electronic device 100, and the like. In addition, the internal memory 121 may include a high-speed random-access memory (RAM), or may include a nonvolatile memory, for example, at least one magnetic disk storage device, a flash memory, or a Universal Flash Storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130, or may be a 3.5 millimeters (mm) Open Mobile Terminal Platform (OMTP) standard interface or cellular telecommunications industry association of the United States of America (CTIA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed on a same touch location but have different touch operation intensity may correspond to different operation instructions. For example, when a touch operation whose touch operation intensity is less than a first pressure threshold is performed on an SMS message application icon, an instruction for viewing a Short Message Service (SMS) message is performed. When a touch operation whose touch operation intensity is greater than or equal to the first pressure threshold is performed on the SMS message application icon, an instruction for creating an SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of a leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, LED and an optical detector, for example, a photodiode. The light-emitting diode may be an infrared emitting diode. The electronic device 100 emits infrared light by using the LED. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194. The touch sensor 180K and the display 194 form a touchscreen that is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in a headset, to form a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into the same SIM card interface 195. The plurality of cards may be of a same type or different types. The SIM card interface 195 may also be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

In this embodiment of this application, in a photographing scenario, the camera 193 captures an image, and the ISP processes data fed back by the camera 193, for example, determines a target object in an image. Optionally, the processor 110 or the NPU in the processor 110 may perform image segmentation on the image processed by the ISP, to determine regions in which different objects or different object types are respectively located on the image. In addition, the processor 110 may track the determined target object in the preview stream.

A software system of the electronic device 100 may use a layered architecture, an event-driven architecture, a microkernel architecture, a micro service architecture, or a cloud architecture. In embodiments of this application, an ANDROID system with a layered architecture is used as an example to describe a software structure of the electronic device 100.

Figure 2:
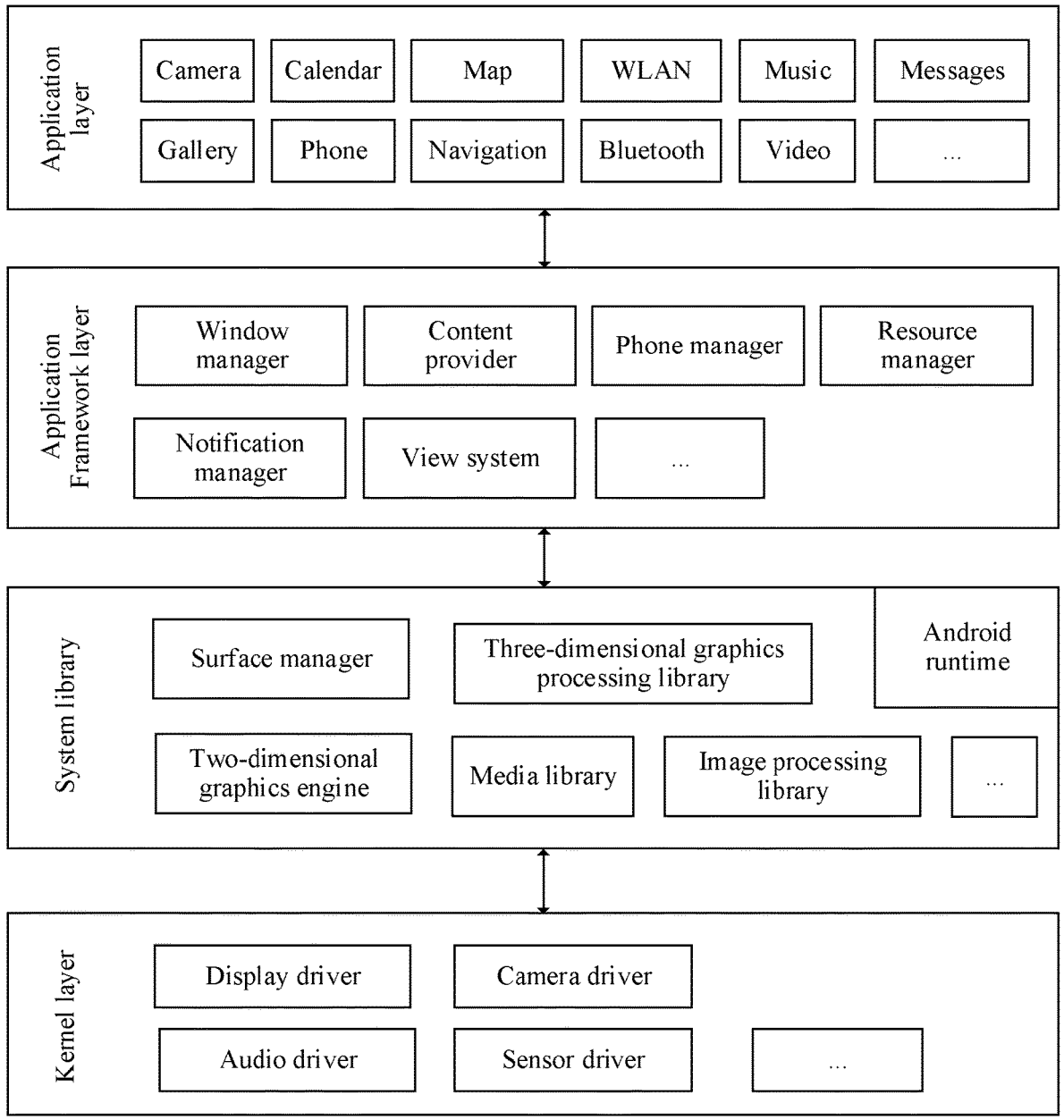
FIG. 2 is a schematic diagram of a software structure of an electronic device according to an embodiment of this application.

FIG. 2 is a block diagram of the software structure of the electronic device 100 according to an embodiment of this application. In a layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom. The application layer may include a series of application packages.

As shown in FIG. 2, the application packages may include applications such as camera, gallery, calendar, phone, map, navigation, WLAN, BT, music, video, and messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The ANDROID runtime includes a kernel library and a virtual machine. The ANDROID runtime is responsible for scheduling and management of the ANDROID system.

The core library includes two parts: a function that needs to be invoked in java language, and a core library of ANDROID.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a two-dimensional (2D) graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Currently, zoom manners mainly include optical zoom and digital zoom. The optical zoom is generated based on a position change of a lens, a field of view, and a focus. In other words, a to-be-photographed object is zoomed in or zoomed out by moving the lens. A larger optical zoom ratio indicates that a photographable target object may be farther away from the lens. The digital zoom increases an area of each pixel in a captured image by using a processor in a terminal (for example, a mobile phone or a digital camera), to achieve an objective of zooming in. However, currently an optical zoom lens that can be used on a mobile phone has a limited zoom capability. For a high-ratio zoom scene, an optical zoom technology still needs to be combined with a digital zoom technology to perform photographing. The digital zoom technology refers to a technology in which a central region of an image captured by the optical zoom lens is cropped based on a zoom ratio specified by a user and then zoomed in at the zoom ratio specified by the user.

Figure 3:
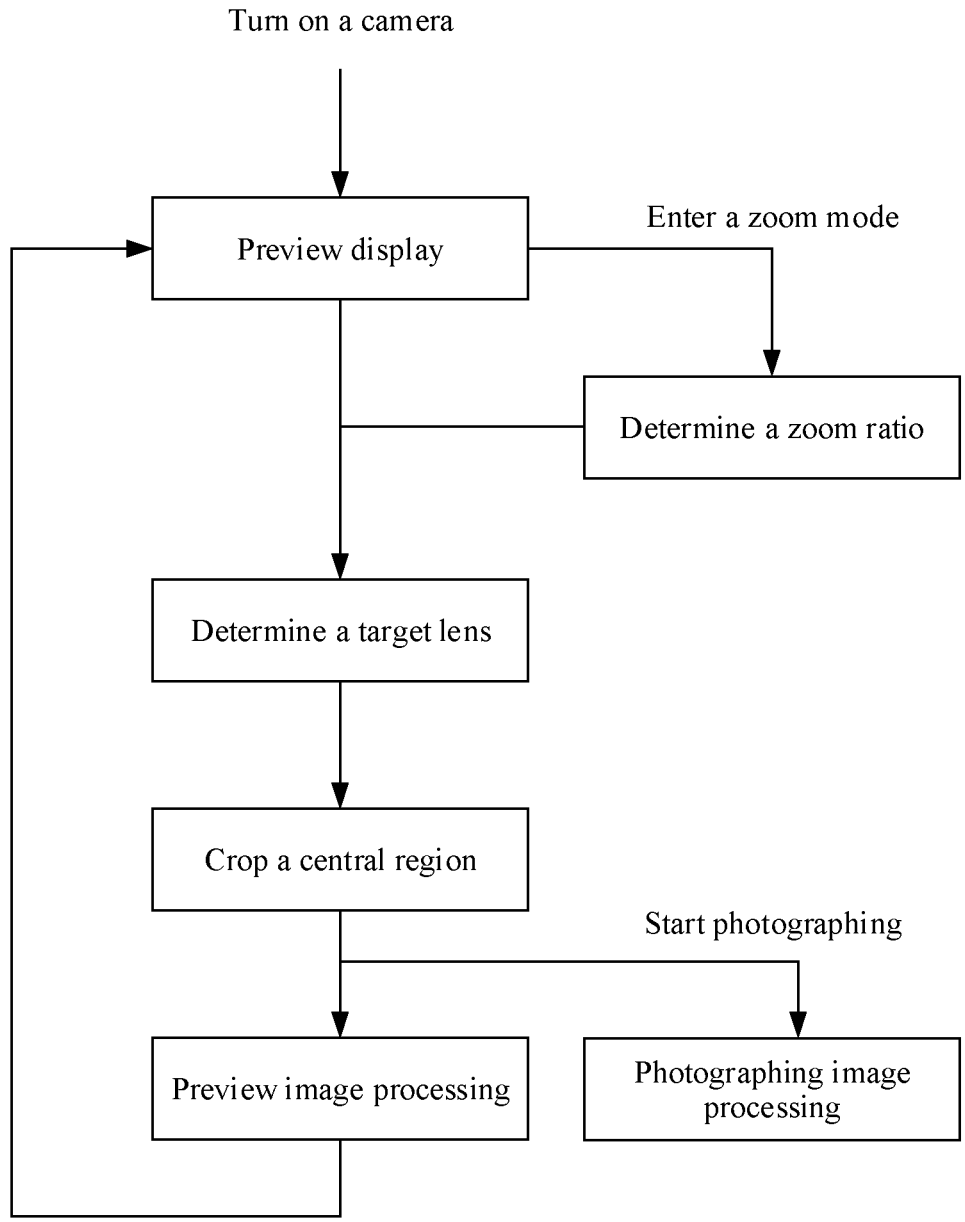
FIG. 3 is a schematic flowchart of an image processing method in a conventional technology.

FIG. 3 is a schematic flowchart of an image processing method in a conventional technology. As shown in FIG. 3, after a user turns on a camera application, a user interface (UI) including a preview display region is displayed on a display of a mobile phone. The preview display region may be used to display a preview stream. The preview stream includes one or more frames of preview images. The user may specify different zoom ratios, for example, 3× or 20×, through a control on the UI. After a zoom ratio is specified by the user, the mobile phone may determine a target lens (namely, a lens for capturing an image of a to-be-photographed region) at the zoom ratio specified by the user, and further determine a quantity of target lenses and a corresponding zoom ratio. For example, a mobile phone has two lenses, an optical zoom ratio of a primary lens is 1×, and an optical zoom ratio of a long-focus lens is 5×. When the mobile phone detects that the zoom ratio specified by the user is 20×, the mobile phone determines that an image needs to be captured by the long-focus lens (namely, the target lens) with the 5× optical zoom ratio. In addition, the mobile phone uses the target lens to photograph the to-be-photographed scene, and performs cropping based on a display specification of the mobile phone, for example, a display size and a display scale, to obtain an original image to be processed by a terminal. The mobile phone may determine, based on the zoom ratio specified by the user, a field of view (FOV) that the user expects to capture and a size of a to-be-cropped region. At a central location of the original image to be processed by the terminal, an image of a corresponding size is cropped based on the determined size of the to-be-cropped region. After image processing and zooming in are performed to reach a corresponding preview resolution, the image is displayed in a preview region.

Figure 4:
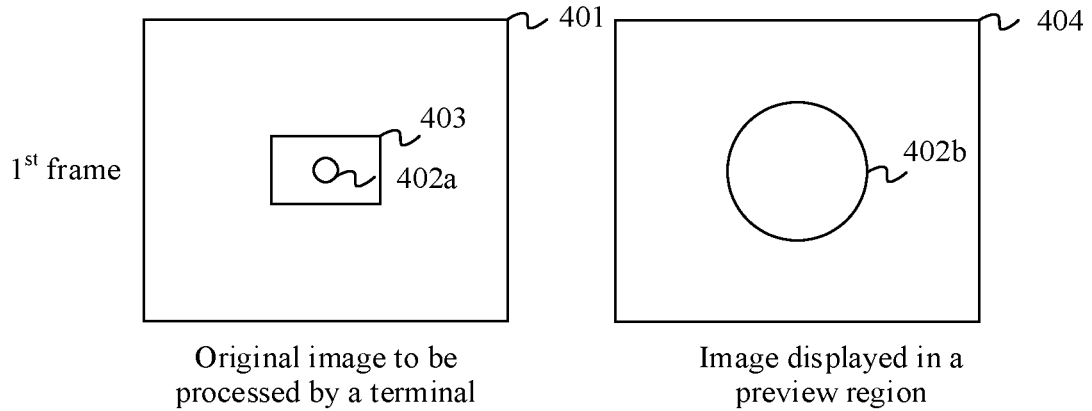
FIG. 4 is a schematic diagram of displaying a $1^{st}$ frame of image of a photographed target object in a high-ratio zoom scene in a conventional technology.
Figure 5:
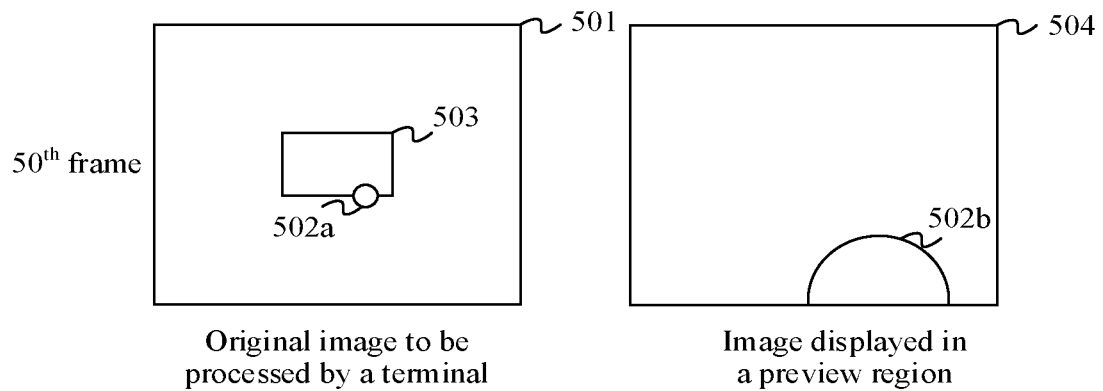
FIG. 5 is a schematic diagram of displaying a $50^{th}$ frame of image of a photographed target object in a high-ratio zoom scene in a conventional technology.
Figure 6:
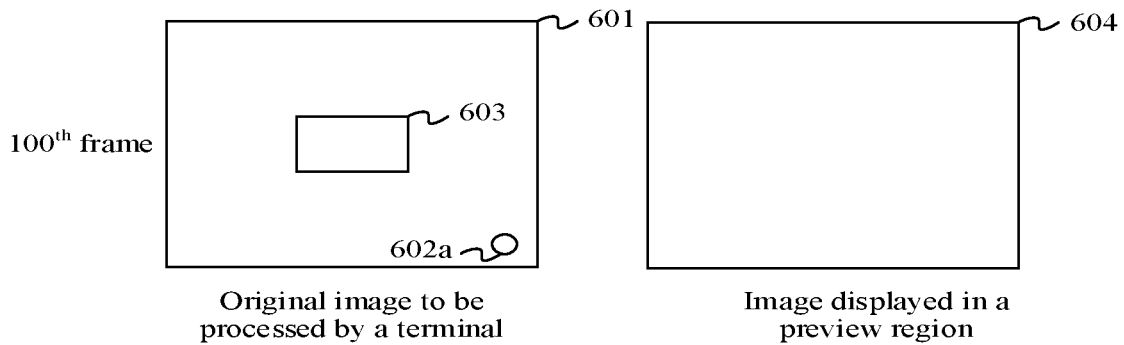
FIG. 6 is a schematic diagram of displaying a $100^{th}$ frame of image of a photographed target object in a high-ratio zoom scene in a conventional technology.

FIG. 4 to FIG. 6 are a group of schematic diagrams of displaying a photographed target object in a high-ratio zoom scene in a conventional technology. FIG. 4, FIG. 5, and FIG. 6 each show an original image to be processed by a terminal and a $1^{st}$ frame, a $50^{th}$ frame, and a $100^{th}$ frame corresponding to an image displayed in a preview region. The original image to be processed by the terminal is an image that is cropped based on a display specification of a mobile phone after the mobile phone uses a target lens to photograph a to-be-photographed scene.

Herein, it is assumed that a zoom ratio specified by a user is 10×, and the mobile phone uses a lens with a 1× optical zoom ratio as the target lens. The mobile phone crops, by using the image processing method shown in FIG. 3, a 1/100 image from a central location in the original image to be processed by the terminal, zooms in the image at a ratio of 1:100, and displays a corresponding image in the preview region.

Further, as shown in FIG. 4, for the $1^{st}$ frame of the photographed image, an original image 401 to be processed by the terminal includes an image 402a of the target object. The mobile phone determines an image size of a to-be-cropped region 403 based on the zoom ratio specified by the user. A center of the original image 401 to be processed by the terminal is used as a center, and an image of a corresponding size is cropped based on the image size of the to-be-cropped region 403. Finally, after image processing and zooming in are performed to reach a corresponding preview resolution, an image 404 is displayed in the preview region, and a preview image 402b of the target object is displayed in the image 404.

Similarly, as shown in FIG. 5, for the $50^{th}$ frame of the photographed image, an original image 501 to be processed by the terminal includes an image 502a of the target object. In this case, a to-be-cropped region 503 covers only part of the image 502a of the target object. Therefore, only part of a preview image 502b of the target object is displayed in an image 504 displayed in the preview region. As shown in FIG. 6, for the $100^{th}$ frame of the photographed image, an original image 601 to be processed by the terminal includes an image 602a of the target object. However, in this case, there is a distance between a to-be-cropped region 603 and the image 602a of the target object, and an image 604 displayed in the preview region does not display a preview image of the target object.

In a high-ratio zoom photographing scenario, hand shakes cause a location change of the photographed target object in the preview region. This makes it difficult for the user to perform image composition, and even causes the photographed target object to move out of the image. Generally, an ideal image may be obtained after several times of photographing, resulting in poor user experience.

In view of this, embodiments of this application provide an image processing solution, including an image processing method and apparatus. A tracking and cropping technology is used for the target object in the to-be-photographed region, to reduce jitters of the target object in the preview image and improve photographing stability. Because problem-resolving principles of the technical solutions are the same or similar, in the following descriptions of specific embodiments, some repeated parts may not be described herein, but it should be considered that the specific embodiments are mutually referenced and may be combined with each other.

Figure 7:
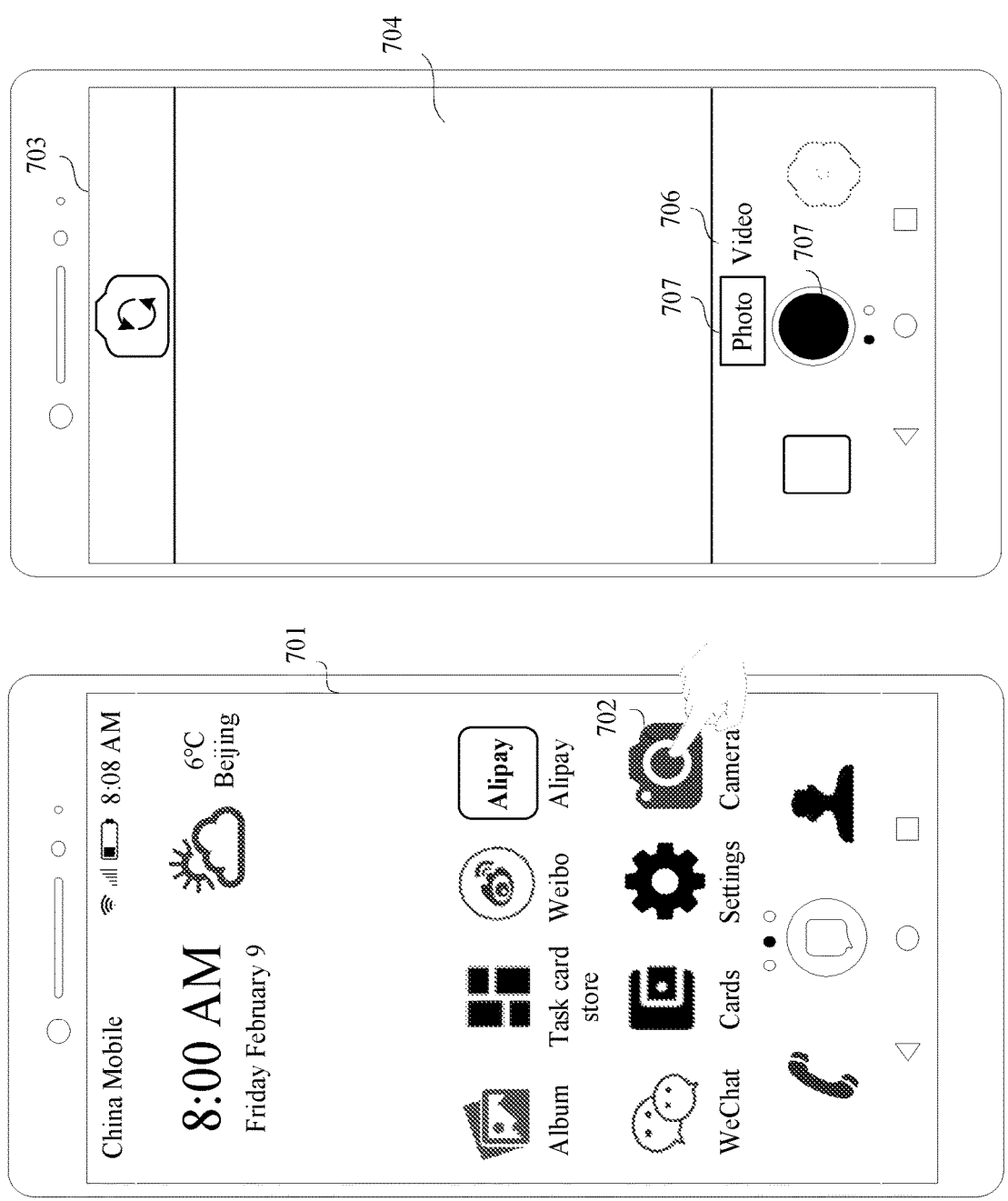
FIG. 7 shows a graphical user interface of a mobile phone according to an embodiment of this application.

FIG. 7 shows a graphical user interface (GUI) of a mobile phone according to an embodiment of this application. The GUI is a desktop 701 of the mobile phone. When the terminal detects an operation that a user taps an icon 702 of a camera application (APP) on the desktop 701, the camera application may be turned on, and another GUI shown in (B) in FIG. 7 is displayed. The GUI may be referred to as a photographing interface 703. The photographing interface 703 may include a viewfinder frame 704. In a preview state, a preview image may be displayed in the viewfinder frame 704 in real time. Herein, the viewfinder frame 704 and content displayed in the viewfinder frame 704 may be a preview region. It may be understood that in a photographing mode and a video recording mode (namely, a video shooting mode), the viewfinder frame 704 may have different sizes. For example, the viewfinder frame shown in (B) in FIG. 7 may be a viewfinder frame in the photographing mode. In the video recording mode, the viewfinder frame 704 may be an entire touchscreen.

For example, as shown in (B) in FIG. 7, after the camera of the mobile phone is turned on, the viewfinder frame 704 may display an image. In addition, the photographing interface may further include a control 705 for indicating the photographing mode, a control 706 for indicating the video recording mode, and a photographing control 707. In the photographing mode, after the mobile phone detects an operation that the user taps the photographing control 707, the mobile phone performs a photographing operation. In the video recording mode, after the mobile phone detects an operation that the user taps the photographing control 707, the mobile phone performs a video shooting operation. Optionally, in the photographing mode, a static photo or a live photo may be taken.

Figure 8:
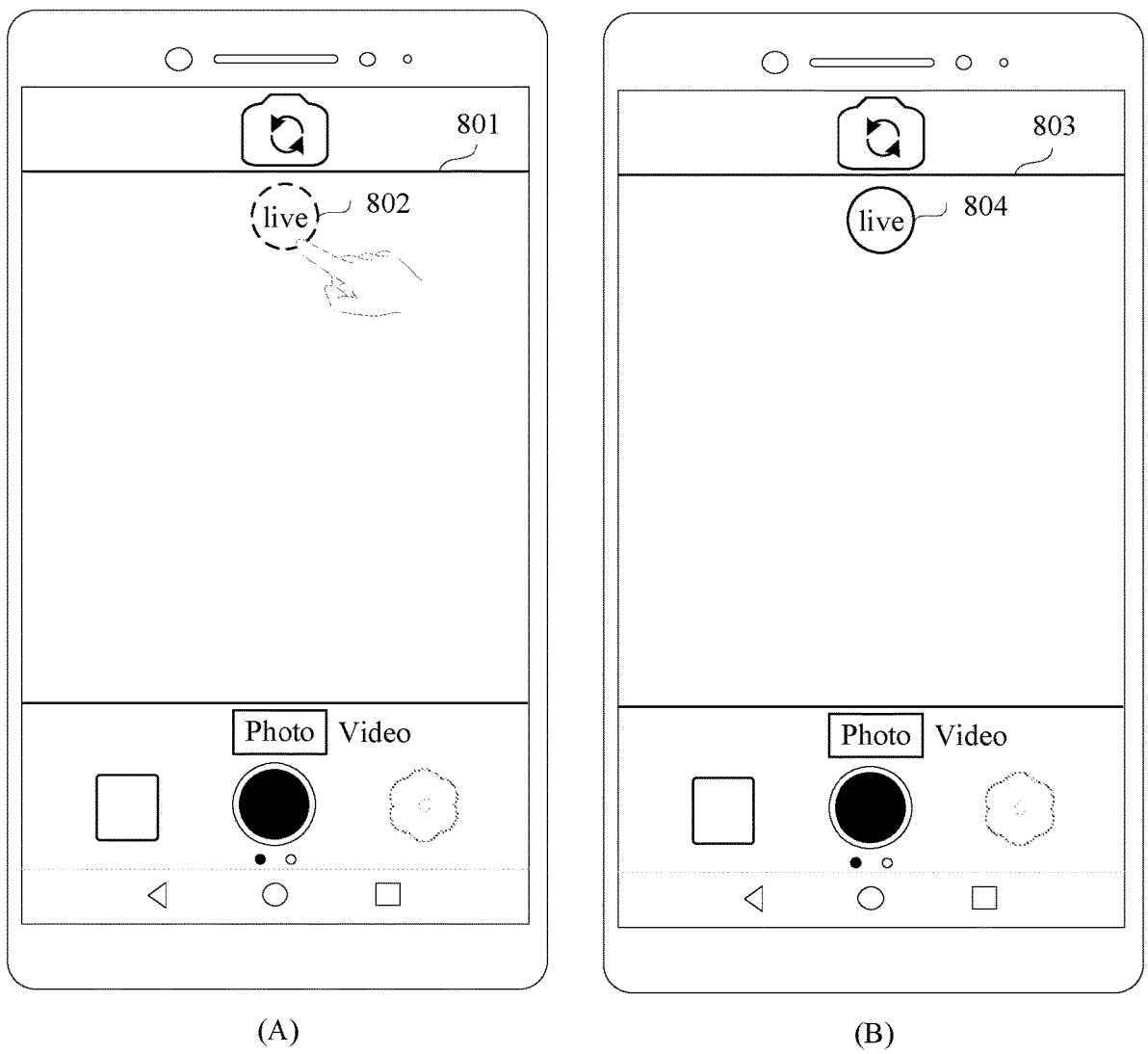
FIG. 8 shows another graphical user interface of a mobile phone according to an embodiment of this application.

Another GUI of the mobile phone is shown in (A) in FIG. 8. The GUI is an interface 801 in a static photo taking mode. After the camera of the mobile phone is turned on, in the photographing mode, the photographing interface in the static photo taking mode may further include a control 802 for indicating to take a live photo. When the mobile phone detects that the user taps the control 802, the mobile phone switches from the static photo taking mode to the live photo taking mode, and displays another GUI shown in (B) in FIG. 8. The GUI is an interface 803 in the live photo taking mode. Similarly, after the camera of the mobile phone is turned on, in the photographing mode, the photographing interface in the live photo taking mode may further include a control 804 for indicating to take a static photo. When the mobile phone detects that the user taps the control 804, the mobile phone switches from the static photo taking mode to the live photo taking mode, and displays the GUI shown in (A) in FIG. 8. Optionally, the control 802 and the control 804 may be a same icon, and are distinguished by highlighting with a color. Optionally, the control 802 and the control 804 may be a same icon, and are distinguished by different types of lines, for example, a solid line and a dashed line, or a thick line and a thin line.

Figure 9:
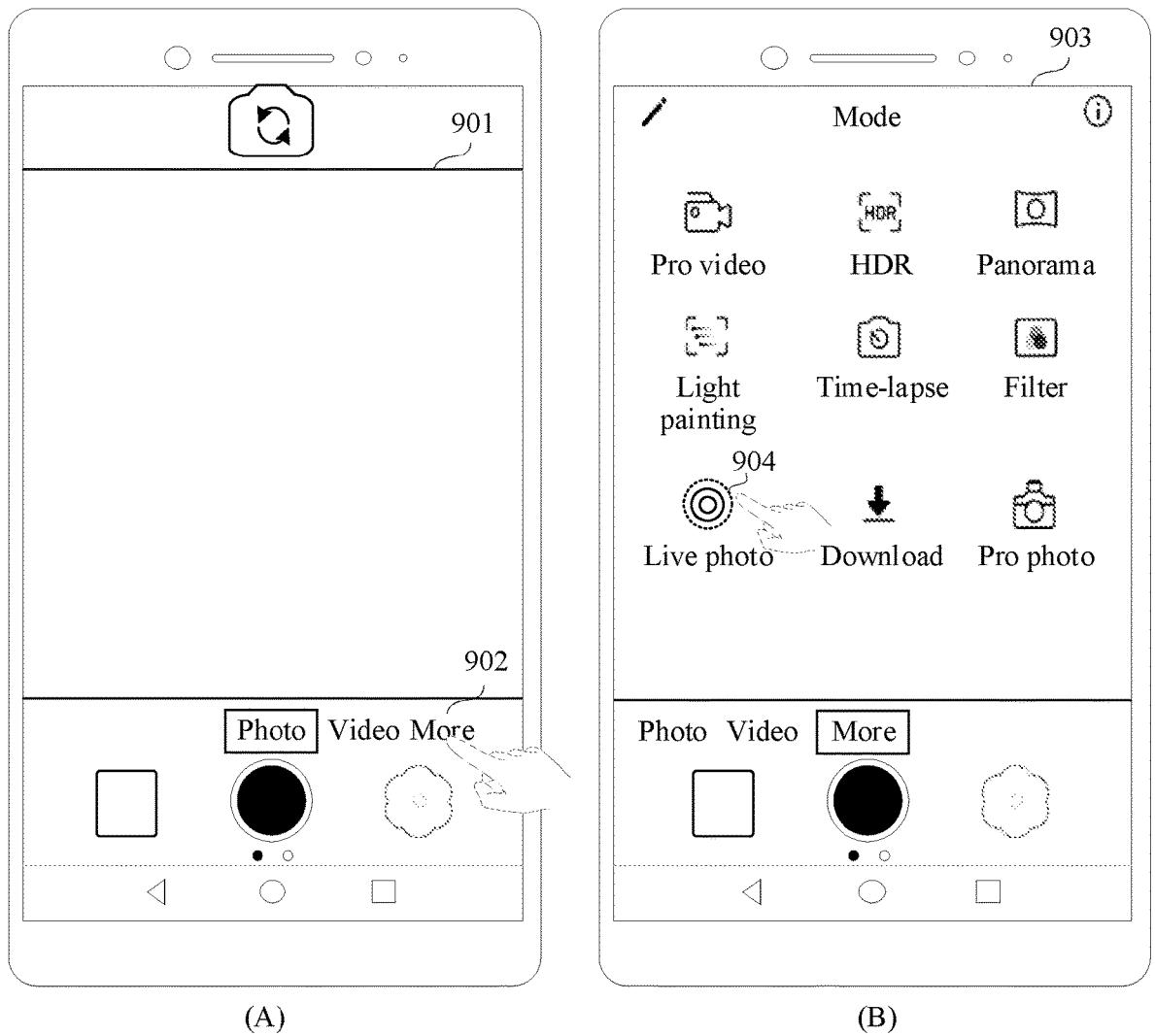
FIG. 9 shows another graphical user interface of a mobile phone according to an embodiment of this application.

In a specific implementation process, there are a plurality of optional designs for entering the GUI in the live photo taking mode. For example, as shown in (A) in FIG. 9, a photographing interface 901 further includes a control 902 for indicating to display other more modes. When the mobile phone detects that the user selects the photographing control 902, for example, the user taps the photographing control 902, or the mobile phone detects that the user slides the photographing control 902 to the center of a GUI, or the mobile phone detects that the user slides the photographing control 902 above a photographing button, a GUI shown in (B) in FIG. 9 is displayed. The GUI is an interface 903. The interface 903 displays a plurality of controls for indicating a specific photographing mode, including a control 904 for indicating the live photo taking mode. When the mobile phone detects that the user taps the photographing control 904, the mobile phone displays the photographing interface 901, and enters the live photo photographing mode.

It should be understood that the image processing method provided in this embodiment of this application may be applied to photographing and processing scenarios of a static photo, a live photo, and a video. This is not limited in this application.

Figure 10:
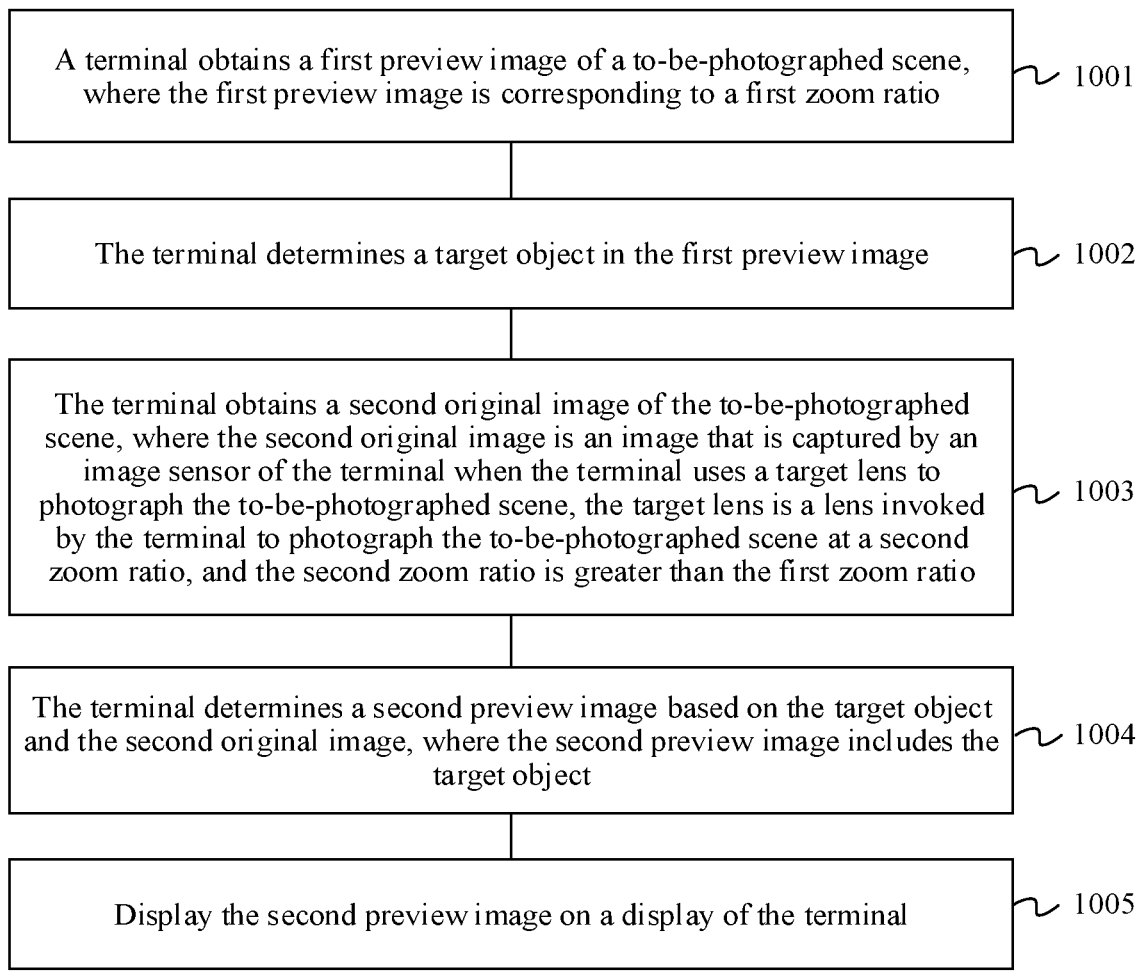
FIG. 10 is a schematic flowchart of an image processing method according to an embodiment of this application.

FIG. 10 is a schematic flowchart of an image processing method according to an embodiment of this application. It should be understood that the image processing method may be performed by a computing device or an electronic device (for example, a terminal), or may be performed by an apparatus (for example, an image processing apparatus) in the electronic device. The image processing apparatus may be an ISP or a SoC. Herein, the terminal is used as an example for detailed description. As shown in FIG. 10, the image processing method 1000 includes the following steps.

S1001: A terminal obtains a first preview image of a to-be-photographed scene, where the first preview image is corresponding to a first zoom ratio.

The first zoom ratio may be a default zoom ratio (for example, a 1× zoom ratio), or may be a zoom ratio specified again by the user for the terminal in a photographing process.

Figure 11A:
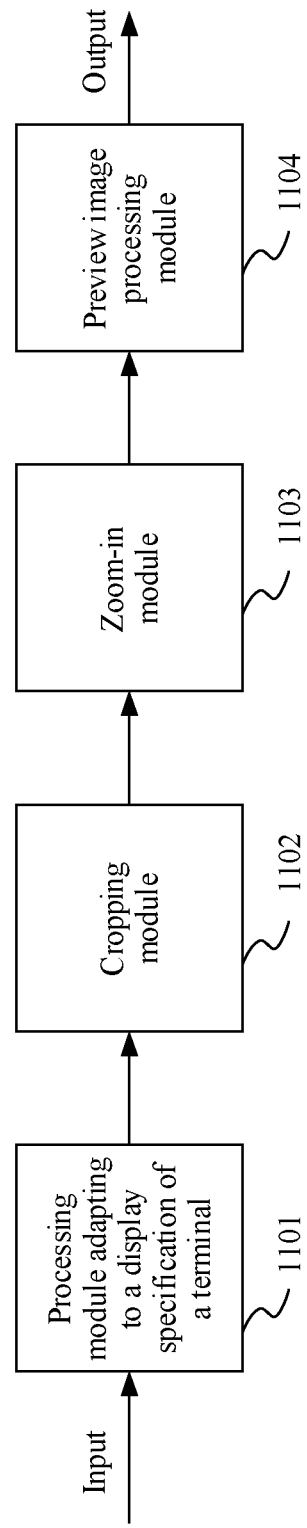
FIG. 11A is a schematic diagram of a structure of a preview image processing algorithm according to an embodiment of this application.

After the user opens a photographing application (for example, a camera) of the terminal, the terminal enters the default zoom ratio (for example, a 1× optical zoom ratio), and determines the target lens as a default lens to photograph the to-be-photographed scene. As the user adjusts a specified zoom ratio, the terminal may redetermine the target lens based on the zoom ratio specified by the user. FIG. 11A is a schematic diagram of a structure of a preview image processing algorithm according to an embodiment of this application. As shown in FIG. 11A, the preview image processing algorithm 1100 includes a processing module 1101 adapting to a display specification of a terminal, a cropping module 1102, a zoom-in module 1103, and a preview image processing module 1104. It should be understood that a sequence of the foregoing modules may be adjusted. The preview image processing module 1104 may be further divided into a plurality of same or different preview image processing modules, to process images in an entire preview image processing process.

For example, the terminal determines the first zoom ratio (for example, 10×), and needs to use a lens with a 1× optical zoom ratio to perform photographing. When the terminal uses the lens to photograph the to-be-photographed scene, a first original image is captured by a sensor of the terminal. The first original image is input into the preview image processing algorithm shown in FIG. 11A, to obtain the first preview image. Further, the first preview image is cropped based on a display specification of the terminal, to obtain an original image to be processed by the terminal. The terminal may determine a size of a to-be-cropped region in a to-be-cropped image and a zoom ratio of the to-be-cropped region based on the first zoom ratio. Further, a central location of the to-be-cropped image is used as a center of the to-be-cropped region, actions such as cropping and zooming in are performed based on the determined size and zoom ratio of the to-be-cropped region, and then preview image processing is performed to obtain the first preview image. The to-be-cropped image may be the first original image, or may be the original image to be processed by the terminal, or may be an image that is obtained by performing preview image processing or partial preview image processing (for example, first preview image processing) on the foregoing image.

S1002: The terminal determines a target object in the first preview image.

It should be understood that the target object in this embodiment of this application may be one object, or may be a plurality of objects, or may be all objects in a region (in other words, the target object is a target region). This is not limited herein. In addition, the target region may be of a regular shape, for example, a circle shape, a rectangle shape, or a square shape, or may be of an irregular shape.

There are a plurality of implementations for determining the target object in a specific implementation process. The following provides several examples. The protection scope of this application includes but is not limited to the following examples.

Optionally, the target object in the current first preview image is determined based on the target object in one or more frames of preview images before the first preview image in a preview stream.

The preview stream is displayed on a display of the terminal. The preview stream includes one frame of preview image or a plurality of frames of preview images. Generally, a large sudden change does not occur in locations of several adjacent or neighboring frames of images of the target object in the preview stream. The terminal may determine a location of the target object in the first preview image based on locations of the target object in the one or more frames of preview images before the first preview image in the preview stream. The plurality of frames of preview images may be a plurality of consecutive frames, or may be a plurality of frames at periodic or aperiodic intervals.

Optionally, when detecting that an object corresponding to a system preset object category exists in the first preview image, the terminal determines the object as the target object.

Further, for example, the terminal stores a system preset object, and specific stored content may be an object category label. The terminal performs image recognition on the object in the first preview image in the preview stream, to obtain an object category label in the first preview image, and compares the object category label with the system preset object category label. Alternatively, the terminal performs image segmentation on the first preview image, and matches a segmented image with an image corresponding to the system preset object category label. The image corresponding to the system preset object category label may be obtained from a cloud server, or may be obtained from a local memory. When one object corresponding to the system preset object category exists in the first preview image, the corresponding object is determined as the target object. When a plurality of objects corresponding to the system preset object category exist in the first preview image, a user interaction interface may prompt the user to select and determine the target object, and the object indicated by the user is determined as the target object. When the object corresponding to the system preset object category does not exist in the first preview image, a user interaction interface may prompt the user to determine the target object, and the object indicated by the user is determined as the target object.

It may be understood that the specific storage content of the system preset object may alternatively be an object image. The terminal may perform image segmentation on the first preview image, and directly match a segmented image with the system preset object image.

A system preset object category list may be obtained by learning a photographing habit of the user. An object with a high photographing probability for the user is added to the system preset object category list. For example, based on an image previously taken or browsed by the current user of the terminal and/or a large quantity of other users, a category of an object in the image is identified and marked, to obtain a user photographing object category and a corresponding photographing probability. An object category whose photographing probability is greater than a system preset threshold is added to the system preset object category list. In addition, the system preset object category list may be preset before delivery, or may be set during system upgrade of the terminal, or may be stored in the cloud server. When the terminal performs an image processing method (for example, the image processing method 1000), the system preset object category list is read from the cloud server.

It may be understood that there may be more than one system preset object. When the terminal detects that more than one system preset object exists in the first preview image, the terminal may determine, as the target object, a system preset object that is first detected in the first preview image. Alternatively, a priority is set for the system preset object. The terminal may determine, as the target object, a system preset object that is detected in the first preview image and that corresponds to a highest priority. Alternatively, the terminal may determine, as the target object, an object that appears most frequently in the first preview image and that is corresponding to the system preset object category.

Optionally, the first preview image may be analyzed by using an algorithm such as saliency region detection, to automatically determine the target object that the user wants to photograph. There are many algorithms related to saliency region detection. Conventional methods may be used to extract image features and detect special regions whose image features are different from other regions. Alternatively, a neural network may be trained to analyze the preview image and deduce the target object that the user wants to photograph.

Based on the system preset object category list of the target object, the terminal directly identifies the target object in the first preview image. This reduces user interaction, improves processing efficiency, and facilitates a user operation.

Optionally, a first object is determined as the target object in response to an operation on the first object. In other words, the user directly specifies a specific object as the target object.

Further, for example, the user may specify the object as the target object through a gesture operation of tap, double tap, or touch and hold on the first object. For another example, the user may specify the object as the target object through a gesture operation of touch and hold on the first object in combination with a voice command. The foregoing gesture operations may be a finger touch, or may be a knuckle touch, or may be a single-finger operation, or may be a multi-finger operation. A specific form may be selected based on an actual situation of the terminal.

The terminal may detect the gesture operation through the sensor on the touchscreen, and when detecting the gesture operation of the user on the first object, determine the first object as the target object in response to the operation of the user on the first object.

In the foregoing manner in which the user directly specifies the specific object as the target object, user interaction perception is improved. The terminal can more accurately identify the target object that the user needs to photograph. This improves user experience.

Optionally, in response to an operation of the user on a first region in the first preview image, when an object corresponding to the system preset object category exists in the first region, the object is determined as the target object.

Further, for example, the user may define a specific region through a gesture. After detecting the gesture through the sensor on the touchscreen, the terminal determines an object in the specific region, and determines the object as the target object when the object corresponding to the system preset object category exists in the specific region. For another example, the user may specify a point in the first preview image, and determine the first region with the point as a center. A size of the first region may be determined based on the zoom ratio specified by the user. In this manner, the terminal does not need to perform object detection and image segmentation. This reduces algorithm difficulty.

Optionally, the object in the first region is determined as the target object in response to the operation of the user on the first region in the first preview image. The foregoing operation on the first region may be one or more of operations such as touch and hold, tap, double tap, knuckle tap, and defining a region with a knuckle.

It should be understood that optionally, the determined target object may be identified on a photographing interface. For example, the determined target object is encircled or identified by a shape identifier such as a focus frame or an identifier frame, or a symbol identifier such as a cross-shaped identifier or a star-shaped identifier. A shape of the identifier such as the focus frame or the identifier frame may include but is not limited to a square shape, an elliptical shape, or the like. The square shape and the elliptical shape are simple and easy to implement, and has a low requirement for image recognition precision of the determined target object. The symbol identifier such as the cross-shaped identifier or the star-shaped identifier may be located in a central region of a target object image. A size of the identifier may be adjusted or changed based on a size of the target image or a zoom ratio. For another example, an outline of the target object is displayed and identified. In this manner, the determined target object is more accurately illustrated. The identifier may move as a location of the target object in the preview image moves.

According to the foregoing method, user interaction perception can be improved, accuracy of identifying the target object by the terminal can be improved, and user experience can be improved.

S1003: The terminal obtains a second original image of the to-be-photographed scene, where the second original image is an image that is captured by the image sensor of the terminal when the terminal uses the target lens to photograph the to-be-photographed scene, the target lens is a lens invoked by the terminal to photograph the to-be-photographed scene at a second zoom ratio, and the second zoom ratio is greater than the first zoom ratio.

The second zoom ratio is a zoom ratio specified by the user for the terminal. After determining the second zoom ratio, the terminal may determine the target lens to obtain the second original image. After the second original image is cropped based on the display specification of the terminal, the original image to be processed by the terminal is obtained. If the second zoom ratio is greater than an optical zoom ratio of the target lens, the original image to be processed by the terminal further needs to be processed by using a digital zoom technology.

S1004: The terminal determines a second preview image based on the target object and the second original image, where the second preview image includes the target object.

It should be understood that there are a plurality of implementations in a specific implementation process of S1004. Several examples are provided herein. The examples may be implemented separately or in combination. However, the solutions provided in this application include but are not limited to the following examples.

Optionally, the second preview image is determined based on a location of the target object in the second original image, the second zoom ratio, and the second original image. The second preview image includes the target object. Herein, it may also be understood that the second original image is input to the preview image processing algorithm shown in FIG. 11A, to obtain the second preview image. Specific implementations and calculation parameters of the modules (for example, the cropping module 1102) corresponding to the second preview image are not completely consistent with specific implementations and calculation parameters of the modules corresponding to the first preview image. For example, based on the second zoom ratio, the terminal may determine the target lens, a field of view (FOV) that the user expects to capture, a digital zoom ratio that needs to be used, and the size of the to-be-cropped region. Further, the location of the target object in the second original image is used as a center, a second intermediate image may be cropped based on the determined size of the to-be-cropped region and zoomed in to reach a preview resolution, and then preview image processing is performed to obtain the second preview image. It should be understood that a sequence of the modules in FIG. 11A may be adjusted. The preview image processing module 1104 may be further divided into a plurality of same or different preview image processing modules, to process images in an entire preview image processing process. The preview image processing module 1104 may include one or more algorithm processes, for example, denoising, equalization, and contrast improvement, which may be performed separately or together. For example, the preview image processing process such as denoising may be performed first, then cropping and zooming in are performed, and then the preview image processing process such as equalization and contrast improvement is performed. This is not limited in this application.

In this manner, if the target object exists in the preview stream, an updated preview stream (including the second preview image) can remain stable, despite slight jitters caused by an unstable tracking algorithm, a motion of the target object, or the like. However, in this manner, it is difficult for the user to adjust composition by moving a mobile phone, and the target object remains in an image center of the preview stream.

Figure 11B:
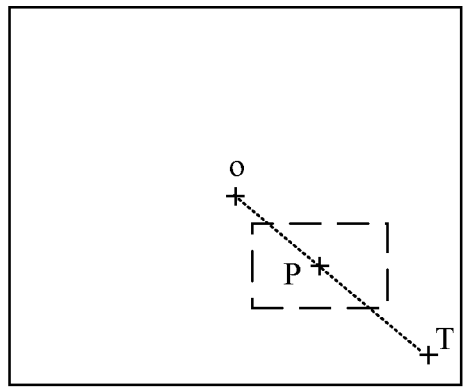
FIG. 11B is a schematic diagram of an image cropping manner according to an embodiment of this application.

Optionally, in a cropping process, the terminal may determine the size of the to-be-cropped region and a location of a central point of the to-be-cropped region by using a location of the target object in the to-be-cropped image as a reference point and based on the second zoom ratio, and further determine the second preview image, so that the target object is not fixed at a middle location of the preview image. This avoids unity of composition. For example, FIG. 11B is a schematic diagram of an image cropping manner according to an embodiment of this application. FIG. 11B shows an image that is captured by a camera and that is cropped based on a display specification. An optical zoom ratio of the camera is Ix. The image has a width of w and a height of h. O is a central location of the image, T is a tracked location of the target object, a central point of the to-be-cropped region is denoted as P, a width and a height of the to-be-cropped region are respectively denoted as $w_c$ and $h_c$, and a zoom ratio specified by the user for the terminal is r. In this case, coordinates of the central point P of the to-be-cropped region and a size of the to-be-cropped region satisfy the following equation:

$$x_p = \frac{1}{r} \times x_T + \left(1 - \frac{1}{r}\right) \times x_0$$
$$y_p = \frac{1}{r} \times y_T + \left(1 - \frac{1}{r}\right) \times y_0$$
$$w_e = \frac{1}{r} \times w$$
$$h_e = \frac{1}{r} \times h$$

To improve diversity of image composition of the user, the location of the target object in the preview image may alternatively be adjusted based on indication of the user. Optionally, a first operation on the target object in the second preview image is received, a target location of the target object in a third preview image is determined in response to the first operation, and a third original image of the to-be-photographed scene is obtained. The third original image is an image that is captured by the sensor of the terminal when the terminal uses the target lens to photograph the to-be-photographed scene. Capture time of the second original image is earlier than that of the third original image.

It should be understood that the first operation may be a gesture operation, a voice operation, a facial operation, or another type of operation. For example, the terminal detects and receives a two-finger drag of the user on the target object in the second preview image through the touchscreen, and determines the target location of the target object in the third preview image based on a direction and a distance of the two-finger drag of the user and the location of the target object in the second preview image. For a change between the target location and a location of the target object in the second preview image, a direction is the same as the direction of the two-finger drag of the user, and a distance is in proportion to the distance of the two-finger drag of the user. A value of the proportion may be set by the user on a system setting interface based on a precision granularity, or may be set based on a usage habit of the user or a large quantity of users.

The second original image and the third original image are different images that are captured by the sensor of the terminal when a same target lens is used to photograph the to-be-photographed scene. Generally, the capture time corresponding to the second original image and the capture time corresponding to the third original image are not completely the same, and a time interval is short.

As described above, the terminal determines a size and a zoom ratio of the to-be-cropped region based on the second zoom ratio, and determines the third preview image based on the third original image and the determined target location of the target object in the third preview image and the size and the zoom ratio of the to-be-cropped region. The to-be-cropped image may be the third original image, or an intermediate image obtained based on the third original image. Herein, refer to the intermediate image obtained based on the second original image. Details are not described herein again.

In the foregoing solution, the location of the target object in the preview image may be adjusted through an indication operation performed by the user on the target object, to meet diversified image composition requirements of the user, and avoid unity caused by a fixed location of the target object in the preview image.

S1005: Display the second preview image on the display of the terminal.

It should be understood that there are a plurality of implementations of how to display the second preview image on the display of the terminal in a specific implementation process. Several examples are provided herein. The examples may be implemented separately or in combination. However, the solutions provided in this application include but are not limited to the following examples.

Figure 12:
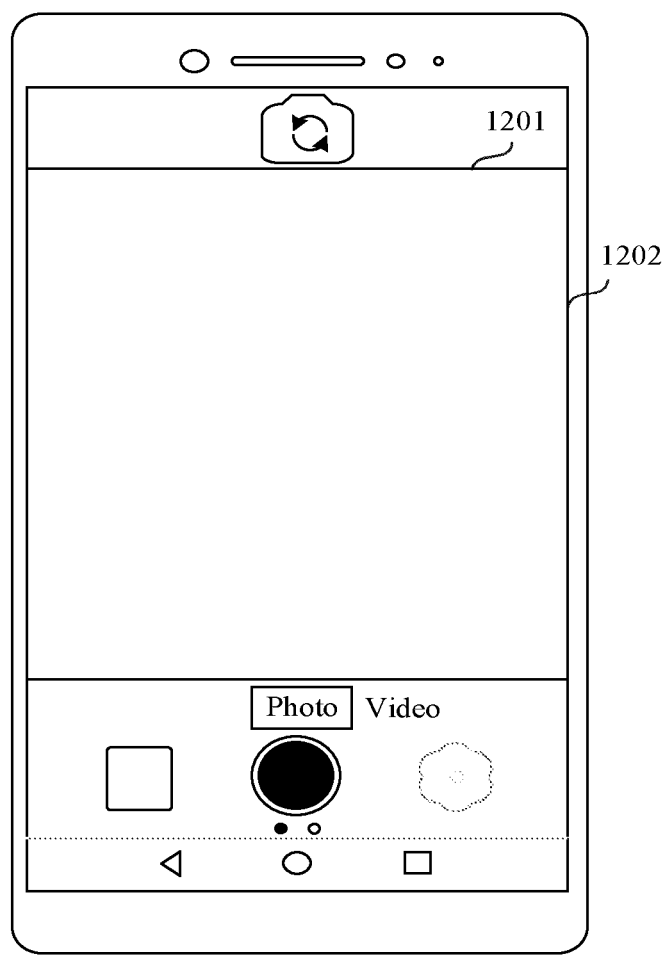
FIG. 12 shows another graphical user interface of a mobile phone according to an embodiment of this application.

Optionally, a preview region is displayed on the display of the terminal. The preview region is used to display the second preview image and another preview image in the preview stream. This manner is simple to implement. For example, FIG. 12 shows another GUI of a mobile phone according to an embodiment of this application. As shown in FIG. 12, a photographing interface 1201 displayed on the display of the terminal includes only one preview region 1202. The preview region 1202 is used to display the second preview image, to assist a user in photographing. However, if the mobile phone is directly held in hand to perform photographing, hand shakes cause great shakes of the lens, and the target object may move out of the current preview region. In this case, the terminal may redetermine the target object or prompt the user to redetermine the target object.

Optionally, at least two preview regions are displayed on the display of the terminal, for example, a first preview region and a second preview region. The first preview region is used to display an auxiliary preview image. The second preview region is used to display the second preview image. The auxiliary preview image includes content of the second preview image. Herein, an FOV of the auxiliary preview image should be greater than or equal to an FOV of the second preview image. The auxiliary preview image is determined based on the second original image or the intermediate image obtained based on the second original image. Under a same condition (for example, for a same to-be-cropped image), a range of a to-be-cropped region corresponding to the auxiliary preview image should be greater than a range of a to-be-cropped region corresponding to the second original image. For example, the auxiliary preview image may be obtained by performing preview image processing on the original image to be processed by the terminal that is obtained after the second original image is cropped based on the display specification of the terminal. For another example, the auxiliary preview image may be an image obtained after a region with a size of $1/n^2$ is cropped from the second original image based on the location of the target object in the second original image and then zoomed in by $n^2$ times to obtain the original image to be processed by the terminal and preview image processing is performed, where n is a positive integer, and n is less than a ratio of the second zoom ratio to the optical zoom ratio of the target lens corresponding to the second original image. Alternatively, the auxiliary preview image may be determined based on an auxiliary original image. The auxiliary original image and the second original image may be different images that are captured by image sensors of the terminal when the terminal uses different lenses to photograph the to-be-photographed scene. In the auxiliary preview image, the target object may be identified by an identifier frame, a symbol, or the like. For a specific identification manner, refer to related descriptions in S1002.

In addition, a location and a size of the first preview region may be adjusted based on a command of the user. For example, on a photographing interface that displays a plurality of preview regions, a first operation of the user on the first preview region is received, for example, a gesture operation such as a drag or another type of operation such as a voice command. In response to the first operation, the location of the first preview region may be changed from an original location to a location indicated by the user. Alternatively, a second operation of the user on the first preview region is received, for example, a gesture operation such as a two-finger drag for zooming or another type of operation such as a voice command. In response to the second operation, the first preview region may be zoomed out or zoomed in at a ratio. Alternatively, on a system setting interface, the user may adjust, by setting a default format (for example, a size and a location) of the first preview region, the location of the first preview region on the photographing interface that displays a plurality of preview regions.

Figure 13:
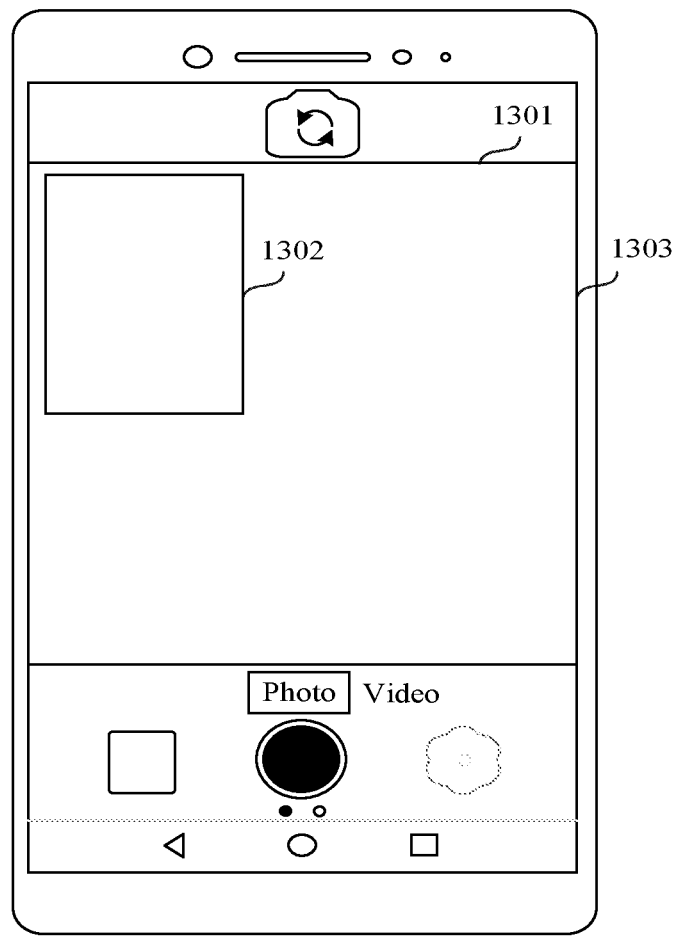
FIG. 13 shows another graphical user interface of a mobile phone according to an embodiment of this application.

For example, FIG. 13 shows another GUI of a mobile phone according to an embodiment of this application. As shown in FIG. 13, a photographing interface 1301 includes a first preview region 1302 and a second preview region 1303. The first preview region 1302 may be used to display the auxiliary preview image. The second preview region 1303 may be used to display the second preview image or a redetermined second preview image. It should be understood that, in a specific implementation process, locations, sizes, shapes, and regions of the first preview region 1302 and the second preview region 1303 may be kept or may be changed. This is not limited herein, and may be designed based on an actual situation of the terminal. In addition, locations of the first preview region 1302 and the second preview region 1303 may be exchanged based on an indication of the user. For example, if the user gesture slides from the first preview region 1302 to the second preview region 1303, the terminal exchanges, in response to the gesture, content displayed in the two preview regions. For example, the first preview region 1302 is used to display the preview image in the preview stream such as the second preview image or the redetermined second preview image, and the second preview region 1303 is used to display the auxiliary preview stream.

For example, the auxiliary preview image displayed in the first preview region 1302 is determined based on the auxiliary original image. The auxiliary original image is an image that is captured by the sensor of the terminal when the terminal invokes a lens 1 to photograph the to-be-photographed scene. The second preview image displayed in the second preview region 1303 is determined based on the second original image. The second original image is an image that is captured by the sensor of the terminal when the terminal invokes the target lens (a lens 2) to photograph the to-be-photographed scene. The auxiliary original image and the second original image are images that are captured by sensors of the terminal when the terminal invokes different lenses to photograph the to-be-photographed scene at a same moment, and correspond to different FOVs. Generally, an optical zoom ratio of the lens 1 is less than or equal to an optical zoom ratio of the lens 2. Herein, it is assumed that the lens 1 is a lens using a 3× optical zoom ratio, the lens 2 is a lens using a 5× optical zoom ratio, and the second zoom ratio (namely, the zoom ratio specified by the user) is 15×. The second original image is cropped based on the display specification of the terminal to obtain the original image to be processed by the terminal. A region with a size of 1/9 is cropped from the original image to be processed by the terminal based on the location of the target object in the second original image and zoomed in by 9 times, and then preview image processing is performed to obtain the second preview image. The auxiliary preview image may be an image obtained after the auxiliary original image is cropped based on the display specification of the terminal. Alternatively, the auxiliary preview image may be an image obtained after a region with a size of $1/m^2$ is cropped based on the location of the target object in the auxiliary original image from an image obtained after the auxiliary original image is cropped based on the display specification of the terminal, the region is zoomed in by $m^2$ times, and preview image processing is performed. Herein, m should be a positive integer less than 5, so that an FOV of the auxiliary preview image is greater than that of the second preview image. In addition, the user may redetermine the target object in the auxiliary preview image. A redetermination manner of the target object may be a gesture command, a mid-air gesture command, a voice command, a facial command (for example, an eyeball movement direction), or the like.

By using the auxiliary preview image, the user may simultaneously perceive the location of the target object in the current second preview image and the location of the target object in the original image or the auxiliary preview image. The user may move the mobile phone based on the auxiliary preview image to obtain different fields of view. This may also reduce a probability that the target object moves out of the image.

Optionally, the image processing method 1000 may further include S1006.

S1006: The terminal saves a target image in response to a user tap on a photographing control.

The target image may be one frame of image, or may be a plurality of frames of images (for example, a video image or a dynamic image). It should be understood that an FOV of the target image is the same as an FOV of the second preview image.

It should be understood that after the user taps the photographing control, the terminal may start a photographing processing algorithm. In a specific implementation process, based requirements of different photographing processing algorithms, a photographing processing algorithm module may input one frame of image or a plurality of frames of images (for example, a plurality of consecutive frames of images). The photographing processing algorithm may be different from the preview image processing algorithm. A specific implementation process includes but is not limited to the following several examples.

Optionally, an image input to the photographing processing algorithm module is the image (for example, the second original image) that is captured by the sensor of the terminal when the terminal invokes the target lens to photograph the to-be-photographed region, and/or an image that is captured by the sensor of the terminal when the terminal invokes another lens (one or more) to photograph the to-be-photographed region at a same moment when invoking the target lens to photograph the to-be-photographed region.

Optionally, the image input to the photographing processing algorithm module is the second original image, and/or the image obtained after the second original image is cropped based on the display specification of the terminal.

Optionally, the image input to the photographing processing algorithm module is the image (for example, the second preview image) in the preview stream. The image in the preview stream may be a whole of one or more frames of original images to be processed by the terminal, or may be a cropped part of one or more frames of original images to be processed by the terminal, for example, an image cropped based on the display specification and the zoom ratio in a center of an image to be processed by the terminal, or an image cropped based on the location of the target object, the display specification, and the zoom ratio from the image to be processed by the terminal.

It should be understood that different images input to the photographing processing algorithm module correspond to different photographing processing algorithms, and adjustment may be performed based on different regions cropped from the images. The photographing processing algorithm includes but is not limited to one or more of the following processing: auto-exposure (AE), auto-focus (AF), auto-white balance (AWB), dynamic range correction (DRC), lens shading correction (LSC), distortion correction, and the like.

Figure 14:
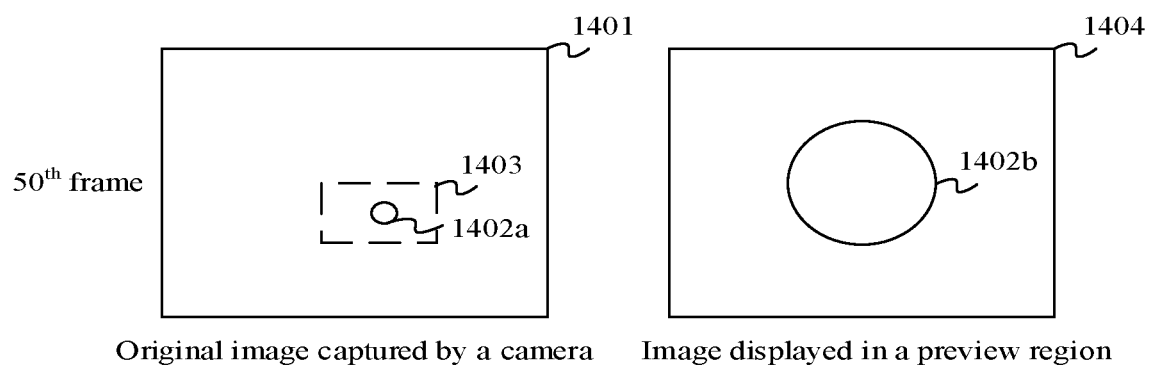
FIG. 14 is a schematic diagram of displaying a photographed target object in a high-ratio zoom scene according to an embodiment of this application.

FIG. 14 is a schematic diagram of displaying a photographed target object in a high-ratio zoom scene according to an embodiment of this application. As shown in FIG. 14, a 50$^{th}$ frame of preview image 1401 to be processed by the terminal includes a target object 1402*a*, but the target object 1402*a* is not located in a central location of the preview image 1401. In the image processing method 1000, a central location of a to-be-cropped region 1403 is determined based on a location of the target object 1402*a* in the preview image 1401. A size of the to-be-cropped region 1403 of the first image is determined based on the location and a zoom ratio of current photographing. An image in the to-be-cropped region 1403 is cropped to obtain a second image. Image processing is performed on the second image and the second image is zoomed in to reach a corresponding preview resolution, to obtain a target image. Herein, the target image may be displayed in an image 1404 displayed in a preview region, and the target image 1402*b* may be located at a central location of the image 1404 displayed in the preview region.

It should be understood that by using the foregoing image processing method 1000, a current preview stream is cropped based on a location of the target object in a current preview image, so that a stable preview stream can be obtained, to avoid that hand shakes cause jitters in the preview image and even the target object moves out of the image.

It should be understood that, in a specific implementation process, the GUI for adjusting a zoom ratio by a user has a plurality of design manners. Herein, several examples are provided. This embodiment of this application includes but is not limited to the following examples.

Figure 15:
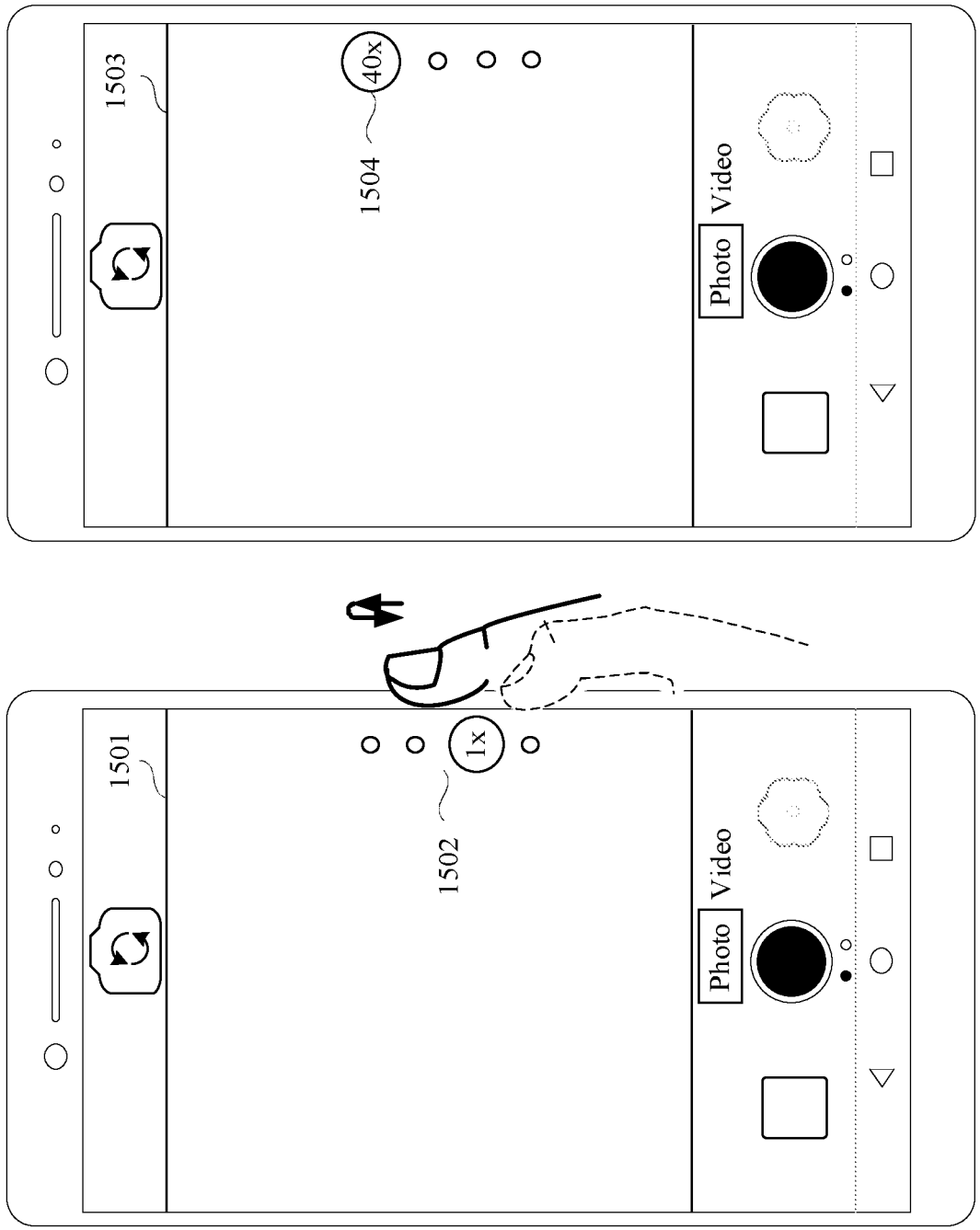
FIG. 15 shows a user interface on which a user adjusts a zoom ratio according to an embodiment of this application.
Figure 16:
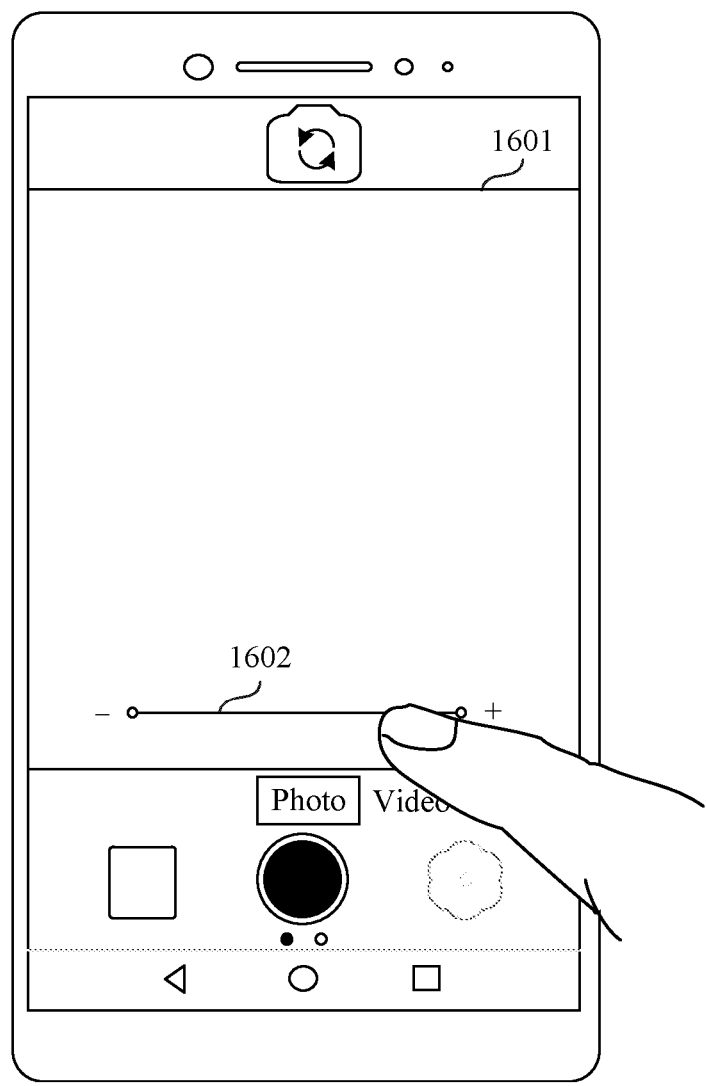
FIG. 16 shows another user interface on which a user adjusts a zoom ratio according to an embodiment of this application.

FIG. 15 shows a GUI on which a user adjusts a zoom ratio according to an embodiment of this application. After the camera of the mobile phone is turned on, in the photographing mode, a GUI shown in (A) in FIG. 15 is displayed. The GUI may be referred to as a photographing interface 1501. A control 1502 for indicating a first zoom ratio exists on the photographing interface 1501. The first zoom ratio is a zoom ratio specified by the user for the mobile phone. The user may slide up or down on the control 1502 with a finger, to select a zoom ratio currently specified for the mobile phone. After the user slides the control 1502 from bottom to top, another GUI shown in (B) in FIG. 15 is displayed, indicating that a zoom ratio specified by the user for the mobile phone changes from 1× (1×) to 40× (40×). FIG. 16 shows another GUI on which a user adjusts a zoom ratio according to an embodiment of this application. A difference from the GUI shown in FIG. 15 lies in that a control 1602 for indicating a first zoom ratio in a photographing interface 1601 and the control 1502 for indicating the first zoom ratio in the photographing interface 1501 have different shapes. The user may slide the photographing control 1602 leftwards or rightwards to adjust a zoom ratio currently used by the mobile phone.

It should be understood that, as the zoom ratio specified by the user changes, a target lens determined by the terminal may be different.

In addition, the GUI displayed in the plurality of preview regions proposed in S1000 may be triggered in a plurality of manners.

Optionally, the terminal tracks a change of a second zoom ratio (namely, the zoom ratio specified by the user). When determining that the second zoom ratio is greater than a preset threshold, the terminal triggers enabling of a multi-preview-region displaying manner.

Figure 17:
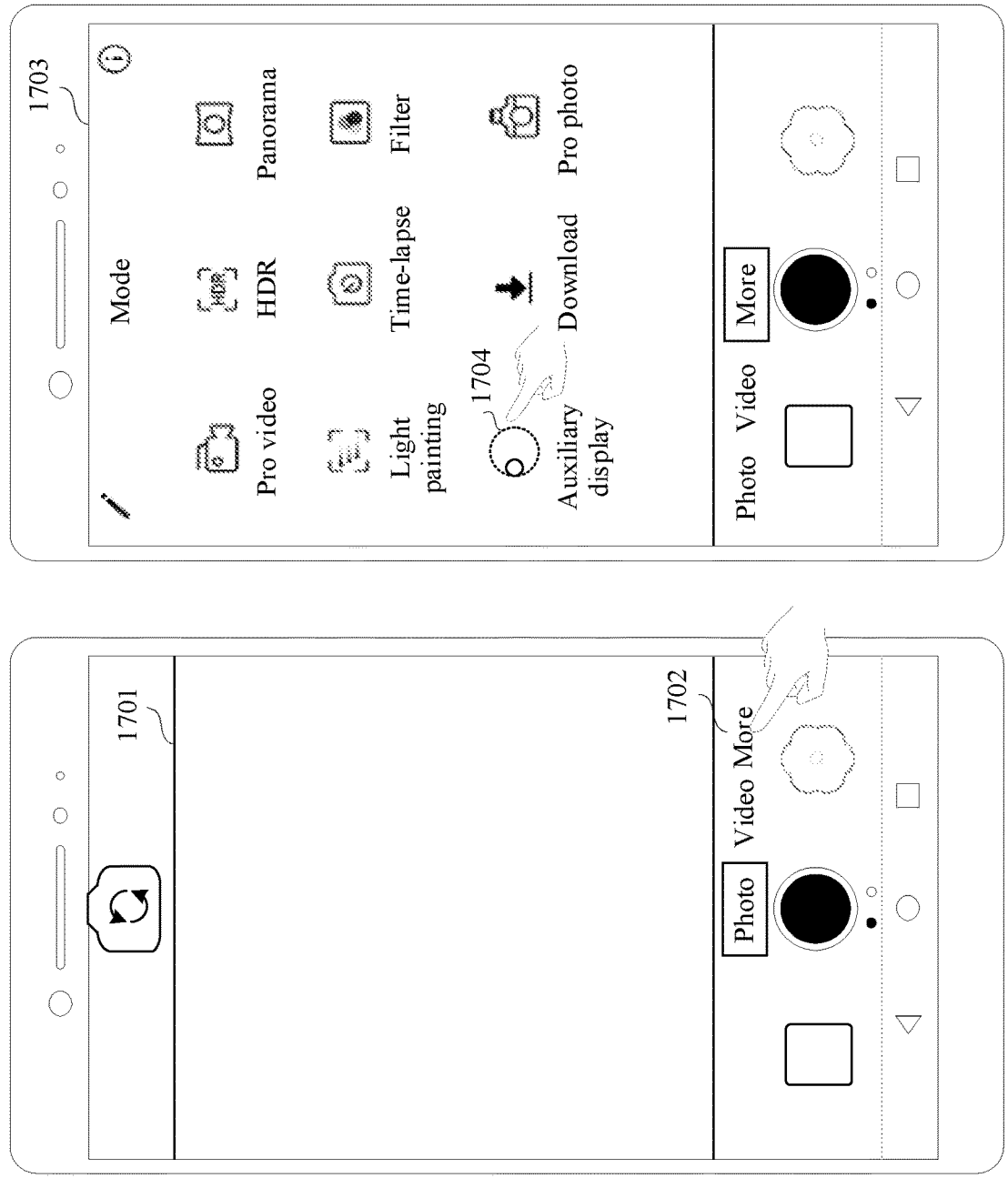
FIG. 17 shows another user interface of a mobile phone according to an embodiment of this application.

Optionally, the terminal is provided with a specific photographing mode for triggering enabling of multi-preview-region displaying. When the user selects to enter the specific photographing mode, multi-preview-region displaying is triggered. For example, as shown in (A) in FIG. 17, a photographing interface 1701 further includes a control 1702 for indicating to display other more modes. When the mobile phone detects that the user selects the photographing control 1702, for example, the user taps the photographing control 1702, or the mobile phone detects that the user slides the photographing control 1702 to the center of a GUI, or the mobile phone detects that the user slides the photographing control 1702 above a photographing button, a GUI shown in (B) in FIG. 17 is displayed. The GUI is an interface 1703. A plurality of controls for indicating a specific photographing mode are displayed in the interface 1703, including a control 1704 for indicating a specific photographing mode for triggering enabling of multi-preview-region displaying. The control 1704 herein is referred to as auxiliary displaying. When detecting that the user taps the photographing control 1704, the mobile phone displays the photographing interface 1701, and enters the specific photographing mode for triggering enabling of multi-preview-region displaying. The specific photographing mode may be referred to as an auxiliary displaying mode, a high-ratio zoom photographing mode, an image stabilization mode, or the like. This is not limited herein.

Optionally, after detecting that the user performs a predefined action on the target object, the terminal triggers multi-preview-region displaying. The predefined action may be knuckle press, double tap, tap, outline defining, or the like.

Herein, multi-preview-region displaying may be directly triggered, to directly display a GUI for multi-preview-region displaying. Alternatively, multi-preview-region displaying may be indirectly triggered. After one or more of the foregoing manners are met, indication information may be displayed on the display of the terminal, to prompt the user to select whether to enter multi-preview-region displaying. After the user selects to enter multi-preview-region displaying, the GUI for multi-preview-region displaying is displayed.

In addition, it should be understood that, if a GUI displaying manner of an auxiliary preview stream is used, the user may specify the target object before a specific mode is entered, or after a specific mode is entered, namely, after the auxiliary preview stream is displayed. If the GUI displaying mode of the auxiliary preview stream is not used, namely, if the GUI has only one preview region, the user needs to specify the target object before the specific mode is entered, or the user needs to specify the target object in an image corresponding to a low or intermediate digital zoom ratio. This avoids that the target object cannot be found in a current preview stream because the image in the current preview stream is zoomed in and the target object is lost. The target object needs to be redetermined after the specific mode is exited, or after the image switches from the high zoom ratio to the low or intermediate digital zoom ratio. Then, the specific mode is entered.

Figure 18:
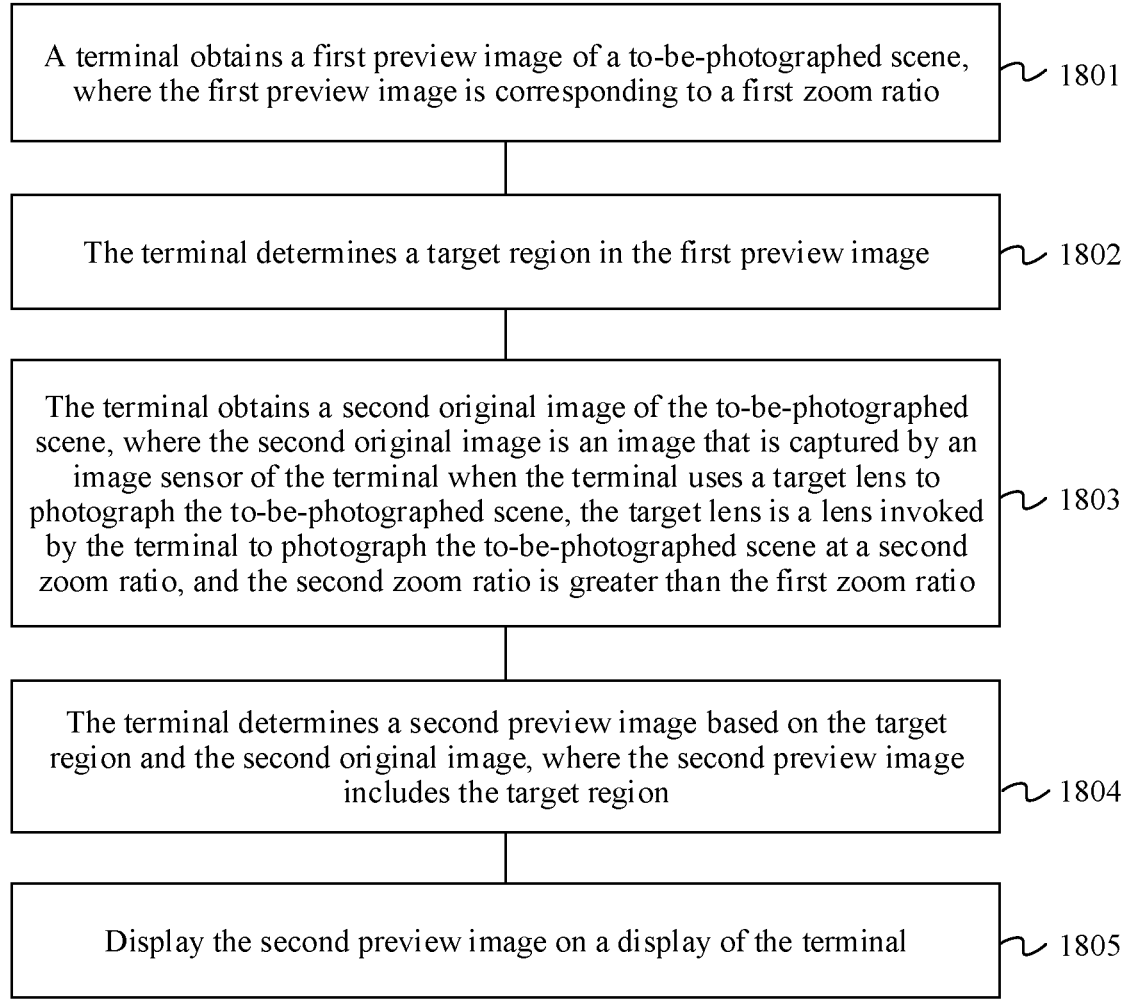
FIG. 18 is a schematic flowchart of another image processing method according to an embodiment of this application.

FIG. 18 is a schematic flowchart of another image processing method according to an embodiment of this application. It should be understood that the image processing method may be performed by a computing device or an electronic device (for example, a terminal), or may be performed by an apparatus (for example, an image processing apparatus) in the electronic device. The image processing apparatus may be an ISP or a SoC. Herein, the terminal is used as an example for detailed description. As shown in FIG. 18, the image processing method 1800 includes the following steps.

S1801: A terminal obtains a first preview image of a to-be-photographed scene, where the first preview image is corresponding to a first zoom ratio.

S1802: The terminal determines a target region in the first preview image.

The target region may be of a regular shape, for example, a circle shape, a rectangle shape, or a square shape, or may be of an irregular shape.

In a specific implementation process, there are a plurality of optional implementation methods for determining the target region. Several examples are provided herein. The examples may be implemented separately or in combination. However, the solutions provided in this application include but are not limited to the following examples.

(1) Optionally, in response to an operation performed by a user on the first region, the first region is determined as the target region. In other words, the user directly specifies a specific region as the target region.

Further optionally, the foregoing operation on the first region may be one or more of operations such as touch and hold, tap, double tap, knuckle tap, and defining a region with a knuckle.

Figure 19:
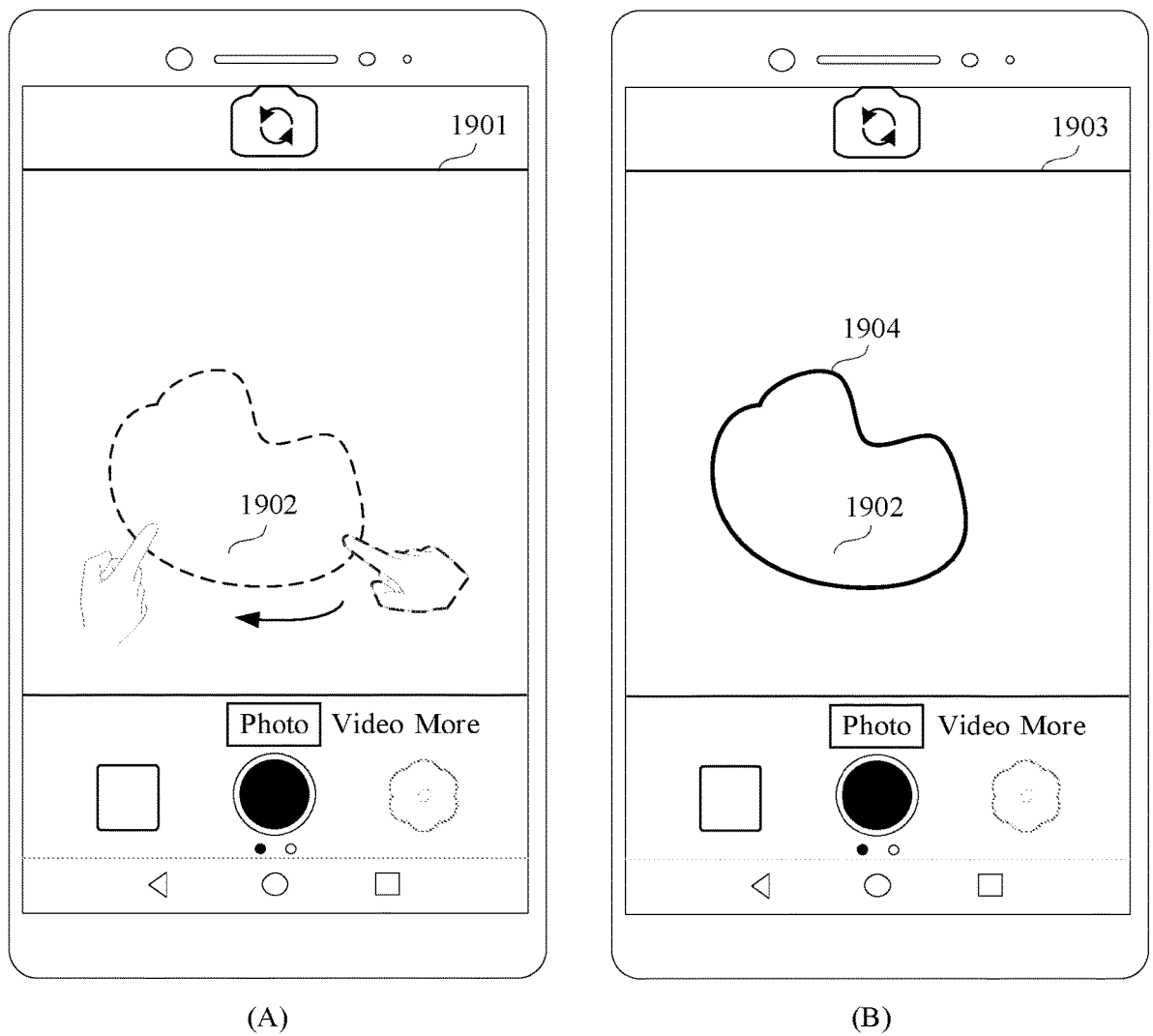
FIG. 19 shows a photographing user interface according to an embodiment of this application.

For example, FIG. 19 shows a photographing GUI according to an embodiment of this application. As shown in (A) in FIG. 19, after the camera of the mobile phone is turned on, in the photographing mode, a current preview image is displayed on a photographing interface 1901. When the mobile phone detects that the user defines a region 1902 with a finger, (B) in FIG. 19 is displayed, where the region 1902 is of an irregular shape. The region 1902 is identified by an identifier frame 1904 on the photographing interface 1903. A shape of the identifier frame 1904 is or is close to an external outline of the region 1902. In addition, prompt information may be further displayed on the photographing interface 1903, to prompt the user to determine whether the defined region in the identifier frame 1904 is the target region that the user currently needs to photograph.

(2) Optionally, in response to the operation performed by the user on the first region, a second region that includes the first region is determined as the target region. In other words, a region of a regular shape is determined as the target region based on the specific region specified by the user.

Figure 20A:
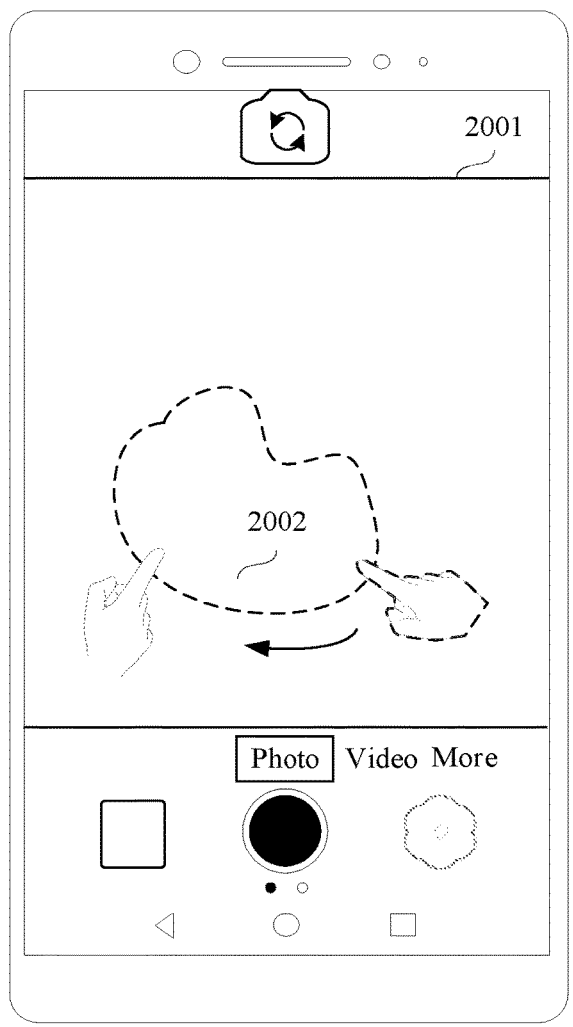
FIG. 20A to FIG. 20D show another photographing user interface according to an embodiment of this application.
Figure 20B:
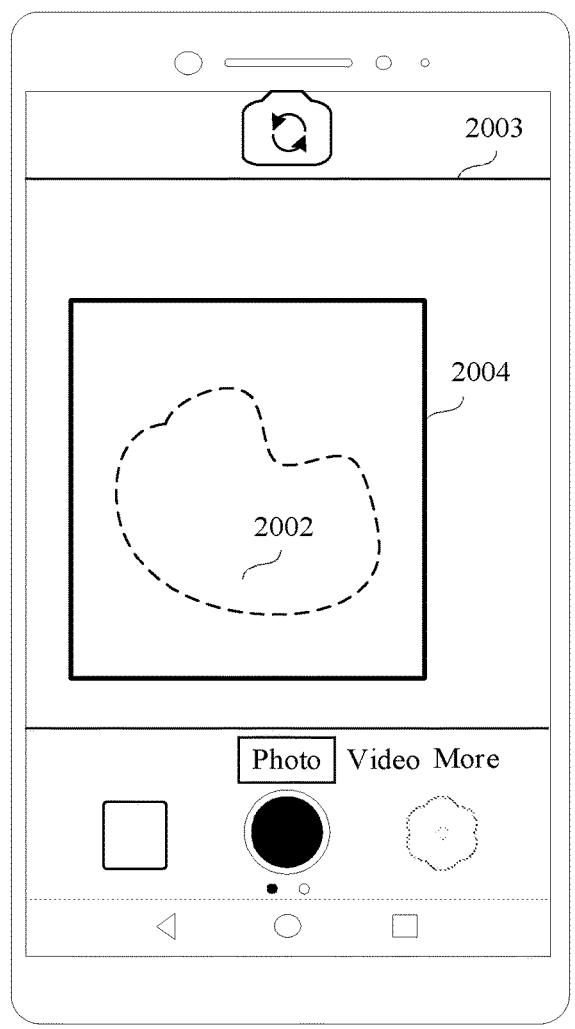
Figure 20C:
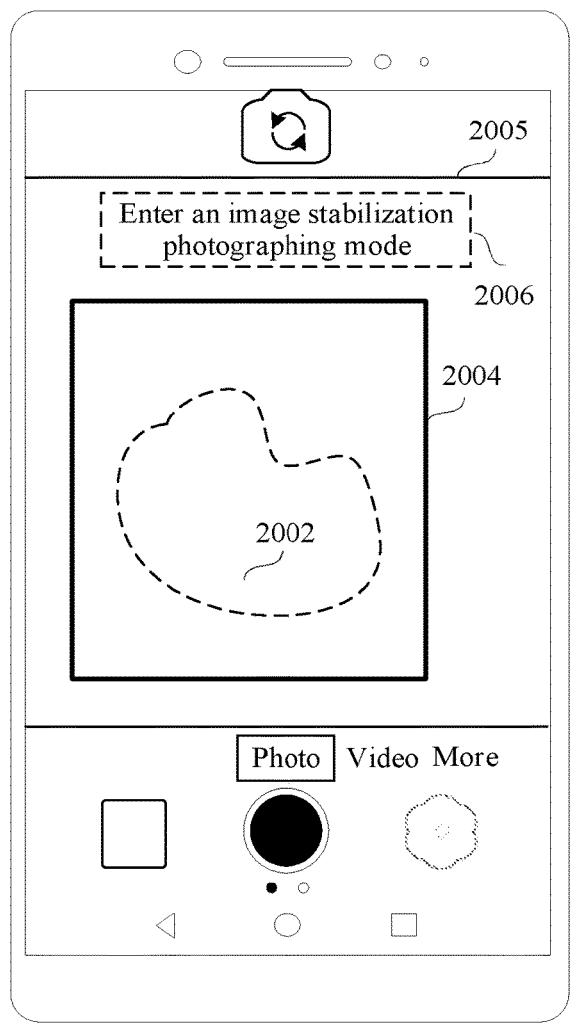
Figure 20D:
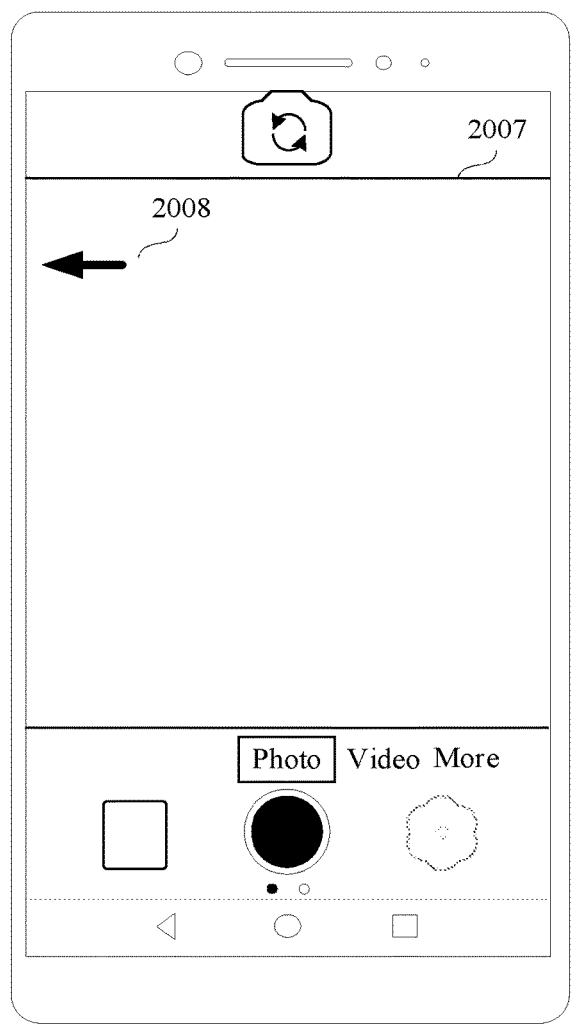

For example, FIG. 20A to FIG. 20D show another photographing GUI according to an embodiment of this application. As shown in FIG. 20A, after the camera of the mobile phone is turned on, in the photographing mode, a current preview stream is displayed on a photographing interface 2001. When the mobile phone detects that the user defines a region 2002 with a finger, FIG. 20B is displayed, where the region 2002 is of an irregular shape. The target region is identified by an identifier frame 2004 on the photographing interface 2003, where the target region includes the region 2002. Alternatively, FIG. 20C is displayed. In addition to the identifier frame 2004, prompt information 2006 may be further displayed on the photographing interface 2005, to prompt the user to determine whether a region defined in the identifier frame 2004 is the target region that the user currently needs to photograph. It should be understood that a length-width ratio of the target region may be determined based on a display specification of the terminal. Herein, in a specific implementation process, there are a plurality of methods for displaying prompt information and for determining, by the user, to enter the image stabilization mode, including but not limited to the following examples. When the user taps the prompt information 2006 to select to enter the image stabilization photographing mode, or slides a finger rightwards on the prompt information 2006 to enter the image stabilization photographing mode, FIG. 20 Dis displayed. A photographing interface 2007 displays an updated preview stream and an exit control 2008. The user taps the exit control 2008 to exit the image stabilization photographing mode and return to an original photographing mode. Alternatively, the user slides a finger leftwards on the prompt information 2006 to exit the image stabilization photographing mode and return to the original photographing mode, so that the terminal is prevented from entering the image stabilization photographing mode by accidental touch. It should be understood that a shape and a style of the exit control 2008 may be designed in a specific implementation process. This is not limited in this application.

(3) Optionally, if it is detected that an object corresponding to a system preset object category exists in the first region, the first region is determined as the target region. Herein, refer to related descriptions of S1001 in FIG. 10.

That the terminal determines a target region in the first preview image may further include: determining a location of the target region.

In a specific implementation process, the location of the target region may be coordinates of the target region, for example, boundary coordinates of the target region, or coordinates of a central location of the target region. After determining the target region, the terminal may track the location of the target region. Further, for example, the terminal may predict a location of the target region in subsequent frames in the preview stream based on a location of the target region in an $i^{th}$ frame of image in the preview stream and/or locations in several frames of images before and after the $i^{th}$ frame of image. The terminal may perform feature representation on the target region based on an image feature of the target region in the preview stream, then perform image feature matching at similar locations in subsequent frames in the preview stream by using the location of the target region in the $i^{th}$ frame of image and/or the locations in the several frames before and after the $i^{th}$ frame of image as a start point, and select a region with a high matching degree as a location of the target region in the subsequent frames. The image feature includes but is not limited to one or more of the following features: color, shape, brightness, texture, corner point, and the like.

It should be understood that an object in the target region may move or change. Optionally, the terminal may analyze an image of the target region, and determine, based on a parameter such as confidence or similarity, whether tracking of the target region currently fails.

Optionally, after tracking of the target region fails, the terminal may prompt, on a display of the terminal, the user to redetermine the target region. For example, after tracking of the target region fails, the terminal may display an indication message on the display of the terminal to prompt the user to redetermine the target region. Alternatively, after the terminal fails to track the target region, a location at which the target region is most likely to appear and that is currently predicted by the terminal is identified on the display of the terminal. After the terminal fails to track the target region, a central location of the preview stream is identified on the display of the terminal, and the user indicates whether the current target region needs to be corrected. If correction is needed, a subsequent method is performed based on a corrected target region.

Optionally, if the tracked target region moves out of the preview stream and cannot be tracked by the terminal, a central location may be identified on the display of the terminal, or the preview stream stops at a last location of the disappeared target region. The user is prompted by indication information to indicate or the user indicates whether the current target region needs to be corrected. If correction is needed, a subsequent method is performed based on a corrected target region.

S1803: The terminal obtains a second original image of the to-be-photographed scene, where the second original image is an image that is captured by an image sensor of the terminal when the terminal uses a target lens to photograph the to-be-photographed scene, the target lens is a lens invoked by the terminal to photograph the to-be-photographed scene at a second zoom ratio, and the second zoom ratio is greater than the first zoom ratio.

S1804: The terminal determines a second preview image based on the target region and the second original image, where the second preview image includes the target region.

S1805: Display the second preview image on the display of the terminal.

Optionally, the image processing method 1800 may further include S1806.

S1806: The terminal saves a target image in response to a user tap on a photographing control.

It should be understood that for technical details and beneficial effects of S1801 to S1806, refer to related descriptions in S1001 to S1006. A difference between the image processing method 1800 and the image processing method 1000 includes that the terminal identifies the target region instead of the target object, but it may also be understood that the entire target region is used as the target object.

For ease of understanding, the following provides several specific examples, and the examples may be combined. Embodiments of this application include but are not limited to the following examples.

Example 1: After the camera of the terminal is turned on, the photographing interface 1201 shown in FIG. 12 is displayed. The photographing interface 1201 includes the preview image 1202. The terminal currently invokes a default target lens (for example, a lens with a 1× optical zoom ratio) to photograph the to-be-photographed scene. In a use process, the user adjusts the zoom ratio specified by the user, for example, from 1× to 20×. When the zoom ratio specified by the user exceeds a preset threshold, a prompt message is displayed on the display of the terminal. The prompt message prompts the user to determine whether the terminal enters the image stabilization photographing mode. A currently determined target object is indicated by an identifier (for example, a cross-shaped identifier). When determining that the target object is correctly identified, the user may select to enter the image stabilization photographing mode. Otherwise, the user may redetermine the target object through an operation such as touch and hold or defining a region with a knuckle. After the terminal enters the image stabilization photographing mode, the second preview image obtained in the method 1000 or the method 1800 is displayed on the photographing interface, and the zoom ratio may still be adjusted on the photographing interface. If the user finds that the target object is not in the current preview image on the photographing interface, the user may slide a finger or tap a return control on the photographing interface, so that the terminal exits the currently displayed second preview image and returns to a preview image corresponding to a lower digital zoom ratio, and the user redetermines the target object. It should be understood that a value of the preset threshold may be preset by the user. For example, the user may set the value on a system setting interface of the terminal. Alternatively, a value of the preset threshold may be set based on an empirical value. For example, survey is performed on the user to determine a zoom ratio when the user is not aware of slight hand shakes. A value of the ratio is determined as the preset threshold.

When the user indicates photographing, the terminal saves the target image. The target image and the second preview image corresponding to the indicated photographing have a same FOV, and both are cropped from a same region in an image that is cropped from the second original image based on the display specification of the terminal. However, the target image and the second preview image corresponding to the indicated photographing may correspond to different image processing processes.

Example 2: After the camera of the terminal is turned on, the photographing interface 1701 shown in FIG. 17 is displayed. The photographing interface 1701 includes the preview image and a functional option 1702. The terminal currently invokes a default target lens (for example, a lens with a 1× optical zoom ratio) to photograph the to-be-photographed scene. In a photographing process, the user taps the functional option 1702, so that the terminal enters a photographing mode selection interface 1703. The user taps the auxiliary displaying mode (the auxiliary displaying mode may have another name, which is not limited in this application), so that the terminal enters the auxiliary displaying mode for multi-preview-region displaying shown in FIG. 13. The photographing interface 1301 includes the first preview region 1302 and the second preview region 1303. The first preview region 1302 is used to display the auxiliary preview image. The second preview region 1303 is used to display the second preview image. The user may determine the target object in the auxiliary preview image. After the user determines the target object, the target object is identified by an identifier frame or a symbol identifier in the auxiliary preview stream. Further, when the user does not actively determine the target object, the terminal may first identify a target object in the identification manner mentioned in the method 1000, and use the target object as a default target object identifier. In the photographing process, the user may redetermine the target object.

It should be understood that, in a use process, the user may indicate to exit the auxiliary displaying mode through a command, for example, a gesture command, a voice command, or a facial command.

When the user indicates photographing, the terminal saves the target image. The target image and the second preview image corresponding to the indicated photographing have a same FOV, and both are cropped from a same region in an image that is cropped from the second original image based on the display specification of the terminal. However, the target image and the second preview image corresponding to the indicated photographing may correspond to different image processing processes.

It may be understood that the saved target image may further include an auxiliary preview image, and/or an image that is obtained by performing photographing image processing on an image cropped from the second original image or an auxiliary preview image based on the display specification of the terminal. Further, whether to save the foregoing image may be specified by the user by setting options on a user setting interface, or may be determined on the photographing interface through a command of the user, for example, a gesture command (for example, tap and double tap on the photographing control correspond to different target images), a voice command, or a facial command.

Example 3: After the camera of the terminal is turned on, the photographing interface 1201 shown in FIG. 12 is displayed. The photographing interface 1201 includes the preview image and a functional option 1202. The terminal currently invokes a default target lens (for example, a lens with a 1× optical zoom ratio) to photograph the to-be-photographed scene. In a photographing process and a use process, the user adjusts the zoom ratio specified by the user, for example, from 1× to 20×. When the zoom ratio specified by the user exceeds a first preset threshold, the plurality of preview regions shown in FIG. 13 are displayed. The photographing interface 1301 includes the first preview region 1302 and the second preview region 1303. The first preview region 1302 is used to display the auxiliary preview image. The second preview region 1303 is used to display the second preview image. The user may determine the target object in the auxiliary preview image. After the user determines the target object, the target object is identified by an identifier frame or a symbol identifier in the auxiliary preview stream. Further, when the user does not actively determine the target object, the terminal may first identify a target object in the identification manner mentioned in the method 1000, and use the target object as a default target object identifier. In the photographing process, the user may redetermine the target object. When the zoom ratio specified by the user is less than a second preset threshold, the photographing interface is restored to the photographing interface 1201 shown in FIG. 12, where a preview image of the photographing interface 1201 is the second preview image.

It should be understood that a value of the first preset threshold and a value of the second preset threshold may be preset by the user. For example, the user may set the values on a system setting page of the terminal. Alternatively, a value of the first preset threshold may be set based on an empirical value. For example, survey is performed on the user to determine a zoom ratio when the user is not aware of slight hand shakes. A value of the ratio is determined as the first preset threshold. Survey is performed on the user to determine a zoom ratio corresponding to displaying similarity that is between an FOV of the auxiliary preview image and an FOV of the second preview image and that is the most intolerable by the user. The ratio is determined as the second preset threshold.

Figure 21:
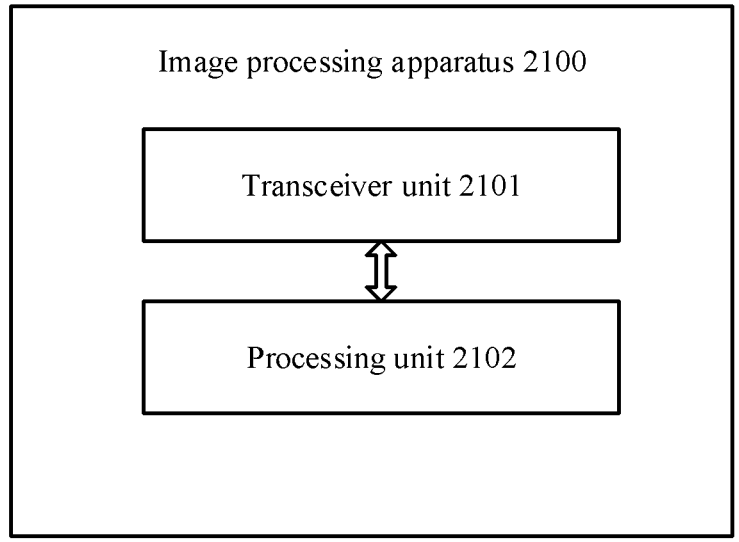
FIG. 21 is a schematic diagram of a structure of an image processing apparatus according to an embodiment of this application.

FIG. 21 is a schematic diagram of a structure of an image processing apparatus according to an embodiment of this application. The image processing apparatus may be a computing device or an electronic device (for example, a terminal), or may be an apparatus in an electronic device (for example, an ISP or a SoC). In addition, the image processing method shown in FIG. 6 or FIG. 11 and the foregoing optional embodiments may be implemented. As shown in FIG. 21, the image processing apparatus 2100 includes a transceiver unit 2101 and a processing unit 2102.

The transceiver unit 2101 is configured to perform any one of S1001 and S1003 in the image processing method 1000, any one of S1801 and S1803 in the image processing method 1800, and any optional example thereof. The processing unit 2102 is configured to perform any one of S1002, S1004, S1005, and S1006 in the image processing method 1000, any one of S1802, S1804, S1805, and S1806 in the image processing method 1800, and any optional example thereof. For details, refer to detailed descriptions in the method example. Details are not described herein again.

It should be understood that the image processing apparatus in this embodiment of this application may be implemented by software, for example, a computer program or instructions having the foregoing functions, and the corresponding computer program or the corresponding instructions may be stored in a memory inside the terminal. A processor reads the corresponding computer program or the corresponding instructions in the memory to implement the foregoing functions. Alternatively, the image processing apparatus in this embodiment of this application may be implemented by hardware. The processing unit 2102 is a processor (for example, an NPU, a GPU, or a processor in a system chip). The transceiver unit 2101 is a transceiver circuit or an interface circuit. Alternatively, the image processing apparatus in this embodiment of this application may be implemented by a combination of a processor and a software module.

It should be understood that for processing details of the apparatus in this embodiment of this application, refer to related descriptions in FIG. 10 and FIG. 18. Details are not described again in this embodiment of this application.

Figure 22:
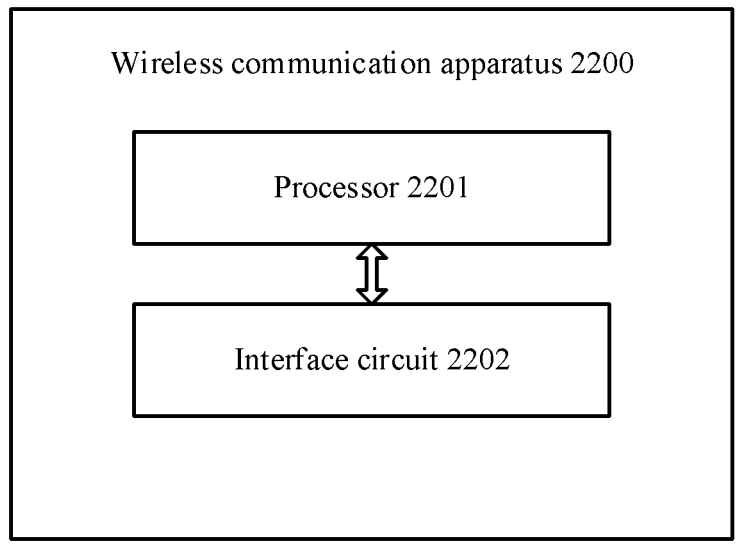
FIG. 22 is a schematic diagram of a structure of another image processing apparatus according to an embodiment of this application.

FIG. 22 is a schematic diagram of a structure of another image processing apparatus according to an embodiment of this application. The image processing apparatus may be a computing device or an electronic device (for example, a terminal), or may be an apparatus in an electronic device (for example, an ISP or a SoC). In addition, the image processing method shown in FIG. 6 or FIG. 11 and the foregoing optional embodiments may be implemented. As shown in FIG. 22, the image processing apparatus 2200 includes a processor 2201 and an interface circuit 2202 coupled to the processor 2201. It should be understood that only one processor and one interface circuit are shown in FIG. 22. The image processing apparatus 2200 may include another quantity of processors and interface circuits.

The interface circuit 2202 is configured to communicate with another component of the terminal, for example, a memory or another processor. The processor 2201 is configured to perform signal interaction with another component through the interface circuit 2202. The interface circuit 2202 may be an input/output interface of the processor 2201.

For example, the processor 2201 reads, through the interface circuit 2202, a computer program or instructions in a memory coupled to the processor 2201, and decodes and executes the computer program or the instructions. It should be understood that the computer program or the instructions may include the foregoing terminal function programs, or may include a foregoing function program of the image processing apparatus applied to the terminal. When the corresponding function program is decoded and executed by the processor 2201, the terminal or the image processing apparatus in the terminal may implement the solutions in the image processing method provided in embodiments of this application.

Optionally, these terminal function programs are stored in a memory outside the image processing apparatus 2200. When the terminal function programs are decoded and executed by the processor 2201, the memory temporarily stores some or all content of the terminal function programs.

Optionally, these terminal function programs are stored in a memory inside the image processing apparatus 2200. When the memory inside the image processing apparatus 2200 stores the terminal function programs, the image processing apparatus 2200 may be disposed in the terminal in this embodiment of the present disclosure.

Optionally, some content of the terminal function programs is stored in the memory outside the image processing apparatus 2200, and other content of the terminal function programs is stored in the memory inside the image processing apparatus 2200.

It should be understood that the image processing apparatuses shown in any one of FIG. 1 to FIG. 2 and FIG. 21 to FIG. 22 may be combined with each other. For related design details of the image processing apparatuses shown in any one of FIG. 1 to FIG. 2 and FIG. 21 to FIG. 22 and the optional embodiments, refer to each other, or refer to related design details of the image processing method shown in any one of FIG. 10 or FIG. 18 and the optional embodiments. Details are not described herein again.

It should be understood that the image processing method shown in any one of FIG. 10 or FIG. 18 and the optional embodiments and the image processing apparatuses shown in any one of FIG. 1 to FIG. 2 and FIG. 21 to FIG. 22 and the optional embodiments may be configured to process a video or an image during photographing, and may also be configured to process a video or an image that has been photographed. This is not limited in this application.

In embodiments of this application and the accompanying drawings, the terms "first", "second", "third", "fourth", and the like are intended to distinguish between similar objects, but do not necessarily indicate a specific order or sequence. In addition, the terms "include", "have", and any other variants thereof are intended to indicate non-exclusive inclusions, for example, including a series of steps or units. The method, system, product, or device is not limited to the steps or units that are literally listed, but may include other steps or units that are not literally listed or that are inherent to these processes, methods, products, or devices.

It should be understood that in this application, "at least one" refers to one or more, and "a plurality of" refers to two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally represents an "or" relationship between associated objects. "At least item (piece) of the following" or a similar expression thereof means any combination of these items, including a single item (piece) or any combination of plural items (pieces). For example, at least one of a, b, or c may indicate a, b, c, a and b, a and c, b and c, or a, b, and c, where a, b, and c may be singular or plural.

It should be understood that sequence numbers of the foregoing processes do not mean execution sequences in this application. The execution sequences of the processes should be determined according to functions and internal logic of the processes, and should not be construed as any limitation on the implementation processes of embodiments of this application. The term "coupling" mentioned in this application is used for indicating interworking or interaction between different components, and may include a direct connection or an indirect connection performed by using another component.

All or some of the foregoing embodiments of this application may be implemented by using software, hardware, firmware, or any combination thereof. When software is used for implementing embodiments, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable or an optical fiber) or wireless (for example, infrared, radio, or microwave) manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; may be an optical medium, for example, a DIGITAL VERSATILE DISC (DVD); or may be a semiconductor medium, for example, a solid state disk (SSD).

In embodiments of this application, the memory is a device or a circuit that has a data or information storage capability, and may provide instructions and data for the processor. The memory includes a read-only memory (ROM), a RAM, a non-volatile RAM (NVRAM), a programmable ROM, an electrically erasable programmable memory, a register, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

It should be noted that, in descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited to "first" and "second" may explicitly or implicitly include one or more features. In the descriptions of embodiments, unless otherwise stated, "a plurality of" means two or more than two.

What is claimed is:

1. A method comprising:
   obtaining a first preview image of a to-be-photographed scene, wherein the first preview image corresponds to a first zoom ratio;
   determining a target object in the first preview image;
   capturing, using an image sensor and a target lens, a second original image of the to-be-photographed scene, wherein the target lens is invoked by a terminal to photograph the to-be-photographed scene at a second zoom ratio, and wherein the second zoom ratio is greater than the first zoom ratio;
   determining, based on the target object and the second original image, a second preview image comprising the target object;
   receiving a first operation on the target object in the second preview image, wherein the first operation determines a target location of the target object in a new preview image;
   capturing, using the image sensor and the target lens, a third original image of the to-be-photographed scene;
   determining, based on the target location and the third original image, a third preview image comprising the target object; and
   displaying the third preview image on a display of the terminal.

2. The method of claim 1, wherein determining the second preview image comprises determining the second preview image based on a location of the target object in the second original image, the second zoom ratio, and the second original image.

3. The method of claim 1, wherein a capture time of the second original image is earlier than that of the third original image.

4. The method of claim 1, further comprising displaying a first preview region and a second preview region on the display when the second zoom ratio is greater than a preset threshold, wherein the first preview region displays an auxiliary preview image, wherein the second preview region displays the second preview image, and wherein the auxiliary preview image comprises content of the second preview image.

5. The method of claim 1, further comprising determining an auxiliary preview image based on the second original image.

6. The method of claim 1, further comprising:
capturing, using image sensors and different lenses, an auxiliary original image and the second original image, wherein the auxiliary original image and the second original image are different images; and
determining an auxiliary preview image based on the auxiliary original image.

7. The method of claim 1, wherein the first preview image comprises a first object, and wherein determining the target object comprises determining the first object as the target object when the first object is a system preset object.

8. The method of claim 1, wherein the first preview image comprises a first object, and wherein determining the target object comprises:
receiving a second operation on the first object in the first preview image; and
determining the first object as the target object in response to the second operation.

9. The method of claim 1, wherein determining the target object comprises:
receiving a third operation on a first region in the first preview image; and
determining an object in the first region as the target object in response to the third operation.

10. The method of claim 1, wherein the second preview image comprises an identifier frame and/or a symbol identifier that identifies the target object.

11. The method of claim 1, further comprising receiving a user input specifying the second zoom ratio.

12. The method of claim 1, wherein the target object is located at a location other than a central location in the second preview image.

13. An image processing apparatus comprising:
a transceiver configured to:
obtain a first preview image of a to-be-photographed scene, wherein the first preview image corresponds to a first zoom ratio; and
capture, using an image sensor and a target lens, a second original image of the to-be-photographed scene, wherein the target lens is invoked by a terminal to photograph the to-be-photographed scene at a second zoom ratio, and wherein the second zoom ratio is greater than the first zoom ratio; and
a processor coupled to the transceiver and configured to:
determine a target object in the first preview image; and
determine a second preview image based on the target object and the second original image, wherein the second preview image comprises the target object,
wherein the transceiver is further configured to:
receive a first operation on the target object in the second preview image, wherein the first operation determines a location of the target object in a new preview image; and
capture, using the image sensor and the target lens, a third original image of the to-be-photographed scene, and
wherein the processor is further configured to:
determine a third preview image based on the target location of the target object in the new preview image and the third original image, wherein the third preview image comprises the target object; and
enable a display of the terminal to display the third preview image.

14. The image processing apparatus of claim 13, wherein the processor is further configured to determine the second preview image based on a location of the target object in the second original image, the second zoom ratio, and the second original image.

15. The image processing apparatus of claim 13, wherein a capture time of the second original image is earlier than that of the third original image.

16. The image processing apparatus of claim 13, wherein the processor is further configured to enable the display to display a first preview region and a second preview region when the second zoom ratio is greater than a preset threshold, wherein the first preview region displays an auxiliary preview image, wherein the second preview region displays the second preview image, and wherein the auxiliary preview image comprises content of the second preview image.

17. The image processing apparatus of claim 13, wherein the processor is further configured to determine an auxiliary preview image based on the second original image.

18. The image processing apparatus of claim 13, wherein the processor is further configured to:
capture, using image sensors and different lenses, an auxiliary original image and the second original image, wherein the auxiliary original image and the second original image are different images; and
determine an auxiliary preview image based on the auxiliary original image.

19. The image processing apparatus of claim 13, wherein the first preview image comprises a first object, and wherein the processor is further configured to determine the first object as the target object when the first object is a system preset object.

20. The image processing apparatus of claim 13, wherein the first preview image comprises a first object, wherein the transceiver is further configured to receive a second operation on the first object in the first preview image, and wherein the processor is further configured to determine the first object as the target object in response to the second operation.

21. The image processing apparatus of claim 13, wherein the transceiver is further configured to receive a third operation on a first region in the first preview image, and wherein the processor is further configured to determine an object in the first region as the target object in response to the third operation.

22. The image processing apparatus of claim 13, wherein the second preview image comprises an identifier frame and/or a symbol identifier that identifies the target object.

23. The image processing apparatus of claim 13, wherein the processor is further configured to receive a user input specifying the second zoom ratio.

24. The image processing apparatus of claim 13, wherein the target object is located at a location other than a central location in the second preview image.

25. A computer program product comprising computer-executable instructions that are stored on a non-transitory computer-readable storage medium and that, when executed by a processor, cause an image processing apparatus to:

obtain a first preview image of a to-be-photographed scene, wherein the first preview image corresponds to a first zoom ratio;

determine a target object in the first preview image;

capture, using an image sensor and a target lens, a second original image of the to-be-photographed scene, wherein the target lens is invoked by a terminal to photograph the to-be-photographed scene at a second zoom ratio, and wherein the second zoom ratio is greater than the first zoom ratio;

determine, based on the target object and the second original image, a second preview image comprising the target object;

receive a first operation on the target object in the second preview image, wherein the first operation determines a target location of the target object in a new preview image;

capture, using the image sensor and the target lens, a third original image of the to-be-photographed scene;

determine, based on the target location and the third original image, a third preview image comprising the target object; and display the third preview image on a display of the terminal.

* * * * *